(12) United States Patent
Petrossi

(10) Patent No.: US 8,335,707 B2
(45) Date of Patent: Dec. 18, 2012

(54) SYSTEM AND METHOD FOR DEVELOPING SALES CONTENT

(75) Inventor: Robert J. Petrossi, Naples, FL (US)

(73) Assignee: Sales Research Institute, Inc., Boston, MA (US)

( * ) Notice: Subject to any disclaimer, the term of this patent is extended or adjusted under 35 U.S.C. 154(b) by 911 days.

(21) Appl. No.: 12/321,367

(22) Filed: Jan. 16, 2009

(65) Prior Publication Data

US 2009/0164306 A1 Jun. 25, 2009

Related U.S. Application Data

(62) Division of application No. 10/742,628, filed on Dec. 19, 2003, now Pat. No. 7,449,870.

(51) Int. Cl.
*G06F 10/00* (2006.01)
(52) U.S. Cl. .................................... 705/7.29
(58) Field of Classification Search ............... 705/7.29
See application file for complete search history.

(56) References Cited

U.S. PATENT DOCUMENTS

| | | | |
|---|---|---|---|
| 6,007,340 A | 12/1999 | Morrel-Samuels | |
| 6,286,005 B1 | 9/2001 | Cannon | |
| 6,556,974 B1 | 4/2003 | D'Alessandro | |
| 7,499,870 B1 | 3/2009 | Petrossi | |
| 7,870,012 B2 * | 1/2011 | Katz et al. | 705/7.26 |
| 2002/0046093 A1 | 4/2002 | Miller et al. | |
| 2003/0046204 A1 | 3/2003 | Chik | |
| 2008/0065445 A1 * | 3/2008 | Livesay et al. | 705/7 |

OTHER PUBLICATIONS

Sales Research Institute, Inc., "How Will Your Company Effectively Implement Marketing Plans & Sales Strategies in an Ever-Changing Economy?," 16 pages (2001) (Month/date of publication not available).

Sales Research Institute, Inc., "The Marketing Plan & Sales Strategy Implementation Solution—The Science of Selling," 15 pages (2001) (Month/date of publication not available).

Sales Research Institute, Inc., "Manager Implementation Manual—The Science of Selling/Implementation Chain Management System," 1-275 (2001) (Month/date of publication not available).

Sales Research Institute, Inc., "The Science of Selling—Sales Productivity System," pp. 1.1-18.4 (1991-1993) (Month/date of publication not available).

Sales Research Institute, Inc., "The Science of Selling—Marketing Integration Workshop," pp. 1-95 (1999) (Month/date of publication not available).

Srikumar, "Are your Customers being Served," (discloses a system for helping companies address their customers' concern quickly) (Month/date/year of publication not available).

Terence, "Getting the Edge in Professional Selling," *Business World*, pp. 1-3 (2002) (Month/date of publication not available).

(Continued)

*Primary Examiner* — Romain Jeanty
(74) *Attorney, Agent, or Firm* — Hamilton, Brook, Smith & Reynolds, P.C.

(57) ABSTRACT

A system and method of developing sales information for use in a buyer-seller environment is directed to providing one or more qualifiers which relate to a sales offering; determining value criteria, for each qualifier, to identify potential value of the sales offering; determining ideal buying criteria based on a competitive analysis; and developing the sales information from the value and buying criteria. The sales information, which can be a letter of understanding (LOU) or a buyer needs assessment, can be stored on a server and updated and accessed by one or more sellers. The updating can be an iterative process that is responsive to feedback about the sales information.

14 Claims, 33 Drawing Sheets

OTHER PUBLICATIONS

Petrossi, "Selling Power, A Hand-on Guide for Sales Management," pp. 1-12 (Month/date/year of publication not available).
Hannu, et al., "Assessment of Hidden and Future Customer Needs in Finish Business-to-Business Companies," (discloses a method for assessing customer needs), *B&D Management*, pp. 1-17 (2001) (Month/date of publication not available).
Notice of Allowance, dated Nov. 6, 2008, U.S. Appl. No. 10/742,628.

* cited by examiner

| STEPS 40 | AVERAGE TIMEFRAME BETWEEN 42 | # OF DAYS TO AGREEMENT 44 | PROBABILITY OF CLOSING AT EACH STEP 46 | RESOURCES AND TOOLS AVAILABLE 48 |
|---|---|---|---|---|
| 1. | DAYS | DAYS | % | |
| 2. | DAYS | DAYS | % | |
| 3. | DAYS | DAYS | % | |
| 4. | DAYS | DAYS | % | |
| 5. | DAYS | DAYS | % | |
| 6. | DAYS | DAYS | % | |
| 7. | DAYS | DAYS | % | |
| 8. | DAYS | DAYS | % | |
| 9. | DAYS | DAYS | % | |
| 10. | | 0 DAYS | % | |

FIG. 2A

| STEPS | AVERAGE TIMEFRAME BETWEEN | # OF DAYS TO AGREEMENT | PROBABILITY OF CLOSING AT EACH STEP | RESOURCES AND TOOLS AVAILABLE |
|---|---|---|---|---|
| 1. SUSPECT IDENTIFICATION | 12 DAYS | 173 DAYS | 5% | TERRITORY PRINTOUT, LEADS, PROSPECTING LIST, TELEPHONE SCRIPTS |
| 2. INITIAL POSITIONING AND QUALIFYING (OPPORTUNITY ASSESSMENT) | 2 DAYS | 161 DAYS | 5% | TWO MINUTE DRILL, OPPORTUNITY ASSESSMENT QUESTIONS |
| 3. LETTER OF UNDERSTANDING | 5 DAYS | 159 DAYS | 10% | PROSPECT'S ANSWERS TO ASSESSMENT QUESTIONS - LOU TEMPLATE |
| 4. LOU VERIFIED | 2 DAYS | 164 DAYS | 30% | COPY OF THE LOU |
| 5. LOU SHARED | 14 DAYS | 152 DAYS | 35% | MASTERMIND GROUP |
| 6. RESOURCES ASSIGNED | 30 DAYS | 138 DAYS | 35% | SALES SUPPORT APPROVAL, TECHNICAL RESOURCES (AVAILABILITY) |
| 7. TECHNICAL REQUIREMENTS REVIEW | 10 DAYS | 108 DAYS | 35% | TECHNICAL TEAM, SUPPORT MANAGER |
| 8. PRESENTATION TO PROSPECT (INITIAL FINDINGS) | 7 DAYS | 98 DAYS | 40% | PRESENTATION, SUPPORT RESOURCES (AS NEEDED) |
| 9. MODIFICATIONS (IF REQUIRED) FROM PROSPECT FEEDBACK | 7 DAYS | 91 DAYS | 45% | PROSPECT'S FEEDBACK |
| 10. PROPOSE PILOT SYSTEM OR FULL ASSESSMENT | 14 DAYS | 84 DAYS | 45% | PROPOSAL FOR PILOT OR ASSESSMENT |
| 11. APPROVAL RECEIVED TO BEGIN PILOT OR ASSESSMENT | 60 DAYS | 70 DAYS | 70% | PROSPECT'S APPROVAL |
| 12. PRESENT PILOT/ASSESSMENT RESULTS | 10 DAYS | 10 DAYS | 80% | PILOT OR ASSESSMENT RESULTS, PROPOSAL ON NEXT STEPS, TECHNICAL SUPPORT |
| 13. CLOSE | 0 DAYS | CLOSED | 100% | AGREEMENT |

FIG. 2B

| KEY CUSTOMER PROBLEMS QICPIC | IMPACT/BENEFIT IF WE SOLVE THE PROBLEM | WHO CARES? | PRIMARY OR SECONDARY TARGET? P | PRIMARY OR SECONDARY TARGET? S |
|---|---|---|---|---|
| CONCERNED ABOUT THE POTENTIAL IMPACT THE INTERNET COULD HAVE ON BRAND AND CUSTOMER LOYALTY | PERSONAL -- ARCHIEVING THIS HELPS THE CLIENT REDUCE RISK AND WORRY OVER WHAT TO DO -- MAKES IT EASIER TO MAKE AN INFORMED DECISION ABOUT WHERE TO GO | PRESIDENT OR VICE PRESIDENT AT THE DIVISION LEVEL | X | |
| | | CORPORATE MARKETING - PERSON CONCERNED WITH BRAND MANAGEMENT | | X |
| | BUSINESS -- I CAN RISK THAT DEALERS AND CUSTOMERS WILL DEFECT TO ANOTHER COMPANY THAT PROVIDES BETTER SUPPORT | VP OF SALES | | X |
| | | IT DEPARTMENT -- THE ONE SENIOR IT PERSON RESPONSIBLE FOR MAKING A COMMERCE AND INTRANET/EXTRANET DECISIONS | X | |
| NEED TO FIND NEW WAYS TO GENERATE REVENUE | BUSINESS TO BUSINESS PROJECTS COULD IMPROVE CUSTOMER LOYALTY, GENERATE NEW ORDERS (E.G. AFTERMARKET PARTS/NEW GEOGRAPHICS, PROMOTIONS), INCREASE ORDER SIZE (PROMPT FOR QUANTITY PRICE BREAKS), AND GENERATE ADVERTISING, REVENUE | VP OF SALES | | X |
| | | VP OF MARKETING | X | |
| | | PRESIDENT OR DIVISIONAL VP/EXECUTIVE | X | |
| NEED TO DECREASE OPERATING COSTS IN DEALING WITH DISTRIBUTORS AND CHANNELS | REDUCED ORDER COST (ON LINE VS. CALL CENTER), REDUCE BACKORDER BY OFFERING SUBSTITUTE PRODUCTS, REDUCE RETURNS AND THE COST OF MARKETING LITERATURE. ALSO CAN REDUCE COSTS BY PROVIDING GREATER RELIABILITY AND EFFECTIVENESS THROUGH THE USE OF TECHNOLOGY AND RELATED CONSULTING SERVICES. THIS WILL INCREASE PROFITABILITY | VP OF MARKETING | X | |
| | | IT COUNTERPART (FOR VP OF MARKETING) | | X |
| | | VP OF SALES | | X |
| | | LINE OF BUSINESS MANAGER | X | |
| INCREASE SPEED IN WORKING WITH DISTRIBUTION ISSUES AND PARTNERS | COULD INCREASE THE SATISFACTION LEVELS OF THE DISTRIBUTORS AND OTHER CHANNELS PLAYERS -- MAKES IT EASIER TO WORK WITH THEM AND MAY IMPROVE THEIR LOYALTY (MORE REVENUE) | INDIVIDUAL DIRECTLY INVOLVED WITH MANAGING THE DISTRIBUTION CHANNELS (MOST LIKELY VP OF MARKETING TITLE) | X | |
| | | VP OF SALES | | X |

FIG. 5B

| KEY CUSTOMER PROBLEMS (????) | IMPACT/BENEFIT IF WE SOLVE THE PROBLEM | WHO CARES? | PRIMARY OR SECONDARY TARGET? | |
|---|---|---|---|---|
| | | | P | S |
| COMPANIES WITH "KNOCK-OFFS" ARE EATING INTO THEIR SPARE PARTS BUSINESS (WHICH IS PROFITABLE) | IF THIS CAN BE REDUCED IT WILL INCREASE REVENUES AND PROFITS | VP OF SALES | X | |
| | | VP OF MARKETING | X | |
| | | LINE OF BUSINESS MANAGER | X | |
| | | | | |
| NEED TO FIGURE OUT A WAY TO ACHIEVE FAST "TIME TO BENEFIT" WITH SAME TYPE OF E-BUSINESS SOLUTION FOR THEIR CHANNELS AND PARTNERS | IF WE CAN SHOW THEM HOW TO DO THIS QUICKLY THEY CAN IMPROVE THEIR POSITIONING WITH THEIR CHANNELS AND END USERS | VP OF MARKETING | X | |
| | | IT COUNTERPART FOR MARKETING | | X |
| | | | | |
| MAY BE LOOKING TO FIGURE OUT HOW TO DO BUSINESS IN BOTH A DIRECT AND INDIRECT WAY WITHOUT GOING "ALL THE WAY" IN ONE DIRECTION OR ANOTHER | IF WE CAN HELP THEM ACHIEVE THIS, THEY CAN STRIVE TO FIND THE CORRECT BALANCE OF DIRECT AND INDIRECT BUSINESS AND MODIFY IT AS CIRCUMSTANCES CHANGE | VP OF MARKETING | X | |
| | | VP OF SALES | X | |
| | | IT COUNTERPART FOR MARKETING | | X |
| | | | | |

FIG. 5C

| KEY QICPIC QUALIFIERS 80 | OPENING QUESTION 82 | CURRENT SITUATION 84 | DESIRED RESULT 86 | IMPACT 88 |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 6A

| KEY QICPIC QUALIFIERS (80) | OPENING QUESTION (82) | CURRENT SITUATION (84) | DESIRED RESULT (86) | IMPACT (88) |
|---|---|---|---|---|
| MAINTAIN OR IMPROVE BRAND LOYALTY | SOME OF MY CLIENTS ARE QUITE CONCERNED ABOUT THE IMPACT THE INTERNET COULD HAVE ON THEIR BRAND LOYALTY, WHILE OTHERS BELIEVE ITS IMPACT WILLL BE OF LITTLE OR NO CONSEQUENCE WHATSOEVER. | HOW WOULD YOU CHARACTERIZE YOUR FEELINGS ABOUT THE INTERNET AND IT'S IMPACT? WHAT IMPACT ARE YOU SEEING TODAY, IF ANY? WHAT ELSE? | WHAT WOULD YOU LIKE TO SEE DONE TO MINIMIZE THE EFFECTS THIS COULD HAVE? WHAT ELSE? | IF YOU DON'T DO ANYTHING, WHAT DO YOU THINK THE LONG TERM IMPACT COULD BE? HOW WOULD YOU FEEL ABOUT THAT? IF YOU ARE ABLE TO TAKE SOME OF THE ACTIONS YOU WERE CONSIDERING TO MINIMIZE THE IMPACT-WHAT DO YOU THINK THAT WILL MEAN TO THE COMPANY? |
| FAST IMPLEMENTATION OF AN E-BUSINESS SOLUTION | WHEN CLIENTS ARE CONCERNED ABOUT THE IMPACT OF THE WEB, I FIND THAT MOST OF THEM WANT TO IMPLEMENT SOME TYPE OF E-BUSINESS SOLUTION QUICKLY | IS QUICK IMPLEMENTATION OF AN E-BUSINESS SOLUTION SOMETHING YOU ARE CONCERNED ABOUT? WHAT ARE YOUR CURRENT THOUGHTS ABOUT WHAT "QUICK IMPLEMENTATION" MEANS? (3 MONTHS- 6 MONTHS - A YEAR?) | WHAT WOULD YOU LIKE TO ACHIEVE IN A SHORT-TERM PROJECT? WHAT ELSE? WHAT WOULD DEFINE "SUCCESS"? | IF YOU COULD ROLL OUT AN E-BUSINESS SOLUTION THAT DID THAT IN A SHORT TIME PERIOD, WHAT IMPACT DO YOU THINK THAT COULD HAVE? HOW WOULD YOUR DISTRIBUTORS REACT TO THAT? |
| IMPROVE CUSTOMER SATISFACTION | | WHAT DO YOU THINK YOUR CURRENT DISTRIBUTORS LIKE THE MOST ABOUT THE CUSTOMER SERVICE YOU PROVIDE? WHAT ELSE WOULD THEY SAY YOU DO WELL? | IS THERE ANY ONE AREA THAT YOU THINK MOST OF THEM WOULD LIKE TO SEE IMPROVED? WHAT AREA IS THAT? ARE THERE ANY OTHER IMPROVEMENTS YOU THINK NEED TO BE MADE? WHAT ELSE? | IF YOU COULD MAKE THOSE IMPROVEMENTS HOW MIGHT THAT IMPACT CUSTOMER SATISFACTION? WHAT WOULD THAT MEAN? DO YOU THINK IT COULD HAVE A POSITIVE IMPACT ON REVENUES? (HOW? HOW MUCH?) |

FIG. 6B

| KEY QICPIC QUALIFIERS (80) | OPENING QUESTION (82) | CURRENT SITUATION (84) | DESIRED RESULT (86) | IMPACT (88) |
|---|---|---|---|---|
| DECREASE COSTS | FOR SOME OF MY CLIENTS REDUCING COSTS AND MANAGING THEIR DISTRIBUTION CHANNEL IS OF UTMOST IMPORTANCE, WHILE OTHERS SEEM TO BE MORE FOCUSED ON GROWING REVENUE. | HOW WOULD YOU CHARACTERIZE YOUR COMPANY'S EFFORTS IN THESE AREAS?<br><br>IF REDUCE COST:<br><br>WHAT AREAS ARE YOU FOCUSING ON FOR COST REDUCTIONS?<br><br>WHAT IS WORKING WELL SO FAR?<br><br>WHAT ELSE? | IF YOU COULD IMPROVE YOUR CURRENT EFFORTS IN SOME WAY, WHAT WOULD YOU DO?<br><br>WHAT ELSE WOULD YOU IMPROVE?<br><br>POTENTIAL FACT FINDING QUESTION:<br><br>HOW MUCH ARE THOSE COSTS RUNNING CURRENTLY?<br><br>HOW MUCH WOULD YOU LIKE TO REDUCE THEM? | WHAT WOULD THE IMPACT BE TO THE BUSINESS IF YOU WERE ABLE TO REDUCE COSTS BY THAT AMOUNT? |
| INCREASE REVENUE | | IF INCREASE REVENUE:<br><br>WHAT AREAS ARE YOU LOOKING AT TO INCREASE REVENUE?<br><br>WHAT KIND OF PROGRAMS HAVE YOU PUT IN PLACE?<br><br>ARE YOU CONSIDERING OTHER WAYS TO INCREASE REVENUE-OR WOULD THEY CONSIDER OTHER PROGRAMS TO INCREASE REVENUE? | WHAT ARE YOUR GOALS FOR GROWING REVENUE?<br><br>CONSIDERING YOUR CURRENT EFFORTS, WHAT WOULD YOU IMPROVE IF YOU COULD?<br><br>WHAT ELSE? | WHAT WOULD THE IMPACT BE IF YOU COULD MAKE THOSE IMPROVEMENTS? |
| EASE OF DOING BUSINESS | | WHEN IT COMES TO BEING "EASY TO DO BUSINESS WITH"...<br><br>WHAT WOULD YOUR DISTRIBUTORS SAY YOUR GREATEST STRENGTHS ARE?<br><br>WHAT ELSE DO YOU THINK THEY LIKE? | WHAT WOULD THEY SAY COULD USE IMPROVING?<br><br>WHAT ELSE? | IF YOU COULD MAKE THOSE IMPROVEMENTS, HOW DO YOU THINK CUSTOMERS WOULD REACT?<br><br>WHAT WOULD THAT MEAN TO THE BUSINESS? |

| KEY QICPIC QUALIFIERS (80) | OPENING QUESTION (82) | CURRENT SITUATION (84) | DESIRED RESULT (86) | IMPACT (88) |
|---|---|---|---|---|
| SPEED OF DOING BUSINESS | | WHEN IT COMES TO HOW QUICKLY YOU CAN MAKE THINGS HAPPEN AND RESPOND TO DISTRIBUTOR QUESTIONS AND ISSUES... WHAT WOULD YOUR DISTRIBUTORS SAY YOU'RE REALLY GOOD AT? WHAT ELSE? | WHAT DO YOU THINK THEY WOULD SAY IS THE ONE THING THEY'D LIKE TO SEE HAPPEN WITH GREATER SPEED? WHAT DO YOU THINK PREVENTS THAT FROM HAPPENING FASTER NOW? WHAT WOULD YOU LIKE TO SEE DONE ABOUT IT? WHAT ELSE WOULD THEY LIKE TO SEE IMPROVED WHEN IT COMES TO SPEED OF DOING BUSINESS? WHAT ELSE? HOW FAST DO THESE THINGS HAPPEN NOW? HOW MUCH FASTER DO YOU THINK THEY SHOULD BE HAPPENING? | IF YOU COULD SPEED THOSE THINGS UP BY THAT MUCH, WHAT IMPACT DO YOU THINK IT COULD HAVE ON THE RELATIONSHIP WITH YOUR DISTRIBUTORS? WHT DO YOU THINK THAT COULD MEAN TO YOUR BUSINESS? |
| BUILD/BUY PREFERENCES | SOME OF THE CUSTOMERS I HAVE WHO ARE LOOKING AT B TO B ARE CONVINCED THEIR OWN ORGANIZATIONS AREN'T WELL SUITED TO BUILDING A SOLUTION ... OTHERS THINK THAT AN INTERNALLY DELVELOPTED SYSTEM WILL WORK JUST FINE. | HOW WOULD YOU CHARACTERIZE YOUR FEELINGS WHEN IT COMES TO BUY VS. BUILD FOR B TO B SOLUTIONS? WHAT DO YOU LIKE BEST ABOUT THAT ALTERNATIVE? WHAT ELSE? | WHAT, IF ANYTHING CONCERNS YOU ABOUT TAKING THAT PATH? WHAT ELSE? | |
| GO DIRECT TO CONSUMER | A BUSINESS TO BUSINESS IMPLEMENTATION IS JUST ONE STEP AWAY FROM A BUSINESS TO CONSUMER MODEL. | WHAT ARE YOUR FEELINGS ABOUT DOING MORE "DIRECT TO CONSUMER" PROMOTIONS AND CONTACT? HOW DO BUSINESS TO CONSUMER COMMUNICATIONS TAKE PLACE NOW? WHAT ELSE WOULD YOU LIKE TO DO? | WHAT ARE THE TOP 2-3 THINGS YOU WOULD LIKE TO DO IN A BUSINESS TO CONSUMER MODEL? WHAT KEEPS YOU FROM DOING THEM TODAY? | IF YOU COULD CONNECT WITH YOUR ACTUAL END USERS IN THAT WAY, WHAT IMPACT MIGHT IT HAVE ON CUSTOMER SATISFACTION? ON BRAND LOYALTY ON REVENUE AND PROFITS ? |

| ANTICIPATED OBJECTION #1. | THE UNDERLYING QUESTION | ANSWER & EXPLANATION |
|---|---|---|
| ANTICIPATED OBJECTION #2. | THE UNDERLYING QUESTION | ANSWER & EXPLANATION |
| ANTICIPATED OBJECTION #3. | THE UNDERLYING QUESTION | ANSWER & EXPLANATION |
| ANTICIPATED OBJECTION #4. | THE UNDERLYING QUESTION | ANSWER & EXPLANATION |

FIG. 7A

| ANTICIPATED OBJECTION #1. | THE UNDERLYING QUESTION | ANSWER & EXPLANATION |
|---|---|---|
| I DON'T SEE WHERE YOUR TWO COMPANIES HAVE ANY REFERENCES WHERE YOU HAVE BUILT A SOLUTION TOGETHER-- YOU'VE DONE SOME THINGS AND THEY'VE DONE SOME THINGS, BUT NOT AT THE SAME ACCOUNT. | IT SEEMS THE REAL QUESTION YOU MIGHT HAVE IS... WHY DON'T YOU HAVE ANY JOINT REFERENCES TOGETHER AND DOESN'T THAT REPRESENT SOME ELEMENT OF RISK TO ME... IS THAT YOUR QUESTION? | THIS IS A NEW RELATIONSHIP ABCD HAS EXPERIENCE IN THE SPECIFIC TECHNOLOGIES REQUIRED TO DO THE TYPE OF BUSINESS TO BUSINESS TRANSACTIONS THAT ARE CRITICAL TO THIS MARKET. THEY HAVE INSTALLED MORE SYSTEMS WITH THESE KEY TECHNOLOGIES THAN ANY VENDOR. FIKTISHUS HAS A 20 YEAR HISTORY OF PARTNERING WITH MANY DIFFERENT COMPANIES -- PART OF OUR STATEGY IS TO DO THIS AND WE KNOW WHAT IT TAKES TO DO JOINT PROJECTS AS BOTH A PRIME CONTRACTOR AND SUBCONTRACTOR WITH OTHER PARTNERS. |

(columns numbered 90, 92, 94)

| ANTICIPATED OBJECTION #2. | THE UNDERLYING QUESTION | ANSWER & EXPLANATION |
|---|---|---|
| I DON'T SEE HOW YOU CAN CONSULT WITH THE ON CHANNEL MANAGEMENT. | PERHAPS THE REAL QUESTION YOU MIGHT HAVE IS... WHY SHOULD YOU TALK TO FIKTISHUS WHEN IT IS NO SURPRISE THAT WE'VE HAD OUT OWN CHANNEL MANAGEMENT PROBLEMS ... IS THAT YOUR QUESTION? PROBLEMS... IS THAT YOUR QUESTION? | AS THE LARGEST PC SUPPLIER IN THE WORLD, FIKTISHUS PROBABLY HAS THE MOST COMPLEX CHANNEL MANAGEMENT ISSUES OF ANY COMPANY IN EXISTENCE. WE ARE IN THE PROCESS OF IMPLEMENTING A SOLUTION FROM ABCD TO IMPROVE OUT WON CHANNEL MANAGEMENT CAPABILITIES. DOES THAT ANSWER YOUR QUESTION? |

FIG. 7B

| ANTICIPATED OBJECTION #3. | THE UNDERLYING QUESTION | ANSWER & EXPLANATION |
|---|---|---|
| I CAN SEE WHAT THE ABCD TECHNOLOGY MIGHT DO FOR ME .... I'M NOT SEEING WHAT FIKTISHUS IS GOING TO DO FOR ME AS PART OF THIS. | I GUESS IT SOUNDS TO ME LIKE THE QUESTION YOU HAVE IS .... WHAT ROLE DOES FIKTISHUS PLAY IN THE IMPLEMENTATION OF THIS PROJECT .... IS THAT YOUR QUESTION? | FIKTISHUS PROVIDES THE NEEDS ANALYSIS AS PART OF THE SOLUTION THAT WE ARE SELLING TOGETHER SO WE CAN REDUCE ANY RISKS ASSOCIATED WITH THIS PROJECT. THEY WILL ENSURE THAT THE APPLICATION INTEGRATES INTO YOUR EXISTING ENVIRONMENT, AND THAT IT PERFORMS AS EXPECTED WITH THE HIGHEST DEGREE OF RELIABILITY. |

| | | | CALCULATIONS |
|---|---|---|---|
| PRESENT SITUATION (AS IS)...... | AVERAGE RAMP-UP FOR NEW HIRES | 60 | DAYS | A1 |
| DESIRED REULT (IMPROVEMENT) | DESIRED RESULT | 5 | DAYS | A2 |
| IMPACT | NEW REVENUE GENERATING DAYS | 55 | DAYS | A3=(A1-A2) | A3 |

| | | | | CALCULATIONS |
|---|---|---|---|---|
| PRESENT SITUATION (AS IS)...... | AVERAGE RAMP-UP FOR NEW HIRES | 60 | DAYS | A1 |
| DESIRED REULT (IMPROVEMENT) | DESIRED RESULT | 5 | DAYS | A2 |
| IMPACT | NEW REVENUE GENERATING DAYS | 55 | DAYS | A3=(A1-A2) / A3 |

| MULTIPLIERS | NEW REVENUE GENERATING DAYS | 55 | DAYS | A3 | A1 |
|---|---|---|---|---|---|
| | NUMBER OF NEW HIRES PER YEAR | 100 | REPS | | A5 |
| | TOTAL NUMBER OF NEW REVENUE GENERATING DAYS | 5,500 | DAYS | A6 (A1*A5) | A6 |
| | DAILY REVENUE PER REP | $500 | DOLLARS | | A7 |
| | NEW HIRE SOLUTION IMPACT | $2,750,000 | DOLLARS | A8 (A6*A7) | A8 |

FIG. 8A

|  | SCENARIO #1 | SCENARIO #2 | SCENARIO #3 | |
|---|---|---|---|---|
| AVERAGE RAMP-UP FOR NEW HIRES | 60 | 60 | 60 | DAYS |
| EXPECTED IMPROVEMENT | 55 | 45 | 35 | DAYS |
| NEW REVENUE GENERATING DAYS | 55 | 45 | 35 | DAYS |

| | | | | |
|---|---|---|---|---|
| NEW REVENUE GENERATING DAYS | 55 | 45 | 35 | DAYS |
| NUMBER OF NEW HIRES PER YEAR | 100 | 100 | 100 | REPS |
| TOTAL NUMBER OF NEW REVENUE GENERATING DAYS | 5,500 | 4,500 | 3,500 | DAYS |
| REVENUE PER REP | $500 | $500 | $500 | DOLLARS |
| IMPACT OF NEW HIRE SOLUTION | $2,250,000 | $2,250,000 | $1,750,000 | DOLLARS |

FIG. 8B

| | | 96 | 100a | 98 CUS- TOMER IMPOR- TANCE | 100 FIKTISHUS CORPORATION 100b | | 102 BIG BLUE CORP | BEE- TOOBEE CORP | BIG- FOUR | CLIENT'S IT ORGAN- IZATION | 104 |
|---|---|---|---|---|---|---|---|---|---|---|---|
| | CAPABILITIES | | | | REAL- ITY | PERCEP- TION | 1 | 2 | 3 | 4 | YOUR STRENGTHS |
| A. | EXPERTISE IN DEVISING SOLUTIONS FOR THE DISCREET MANUFACTURING INDUSTRY | | | H | 5 | 3 | 5 | 2 | 4 | 2-4 | BC |
| B. | END-TO-END SOLUTION SERVICES CAPABILITIES (FROM ARCHITECTURAL DESIGN TO ONGOING SUPPORT) | | | L-H | 5 | 3 | 5 | 2 | 4 | 1 | BC |
| C. | ABILITY TO INTEGRATE A SOLUTION WITH THEIR BACK END DATA | | | H | 4 | | 5 | 3 | 4 | 4 | |
| D. | GLOBAL/INTERNATIONAL SOLUTION ROLL-OUT CAPABILITIES | | | M | 3 | | 3 | 4 | 5 | 2 | |
| E. | RAPID DEVELOPMENT AND DEPLOYMENT CAPABILITIES (FIXED PRICE -- SHORT TIME) | | | H | 5 | 3 | 3 | 4-5 | 3 | 1-2 | BC |
| F. | FINANCIAL STABILITY | | | H | 4 | | 5 | 5 | 5 | 3 | |
| G. | THE RIGHT TECHNICAL SKILLS TO DESIGN AND IMPLEMENT AN EXTRANET SOLUTION THAT DOES WHAT THE CUSTOMER WANTS | | | H | 5 | | 5 | 5 | 5 | 4 | FM |
| H. | HAS A SUITE OF PRE-EXISTING APPLICATION MODULES THAT ARE CUSTOMIZABLE TO MATCH THE CUSTOMER'S REQUIREMENTS | | | H | 4 | | 2 | 2 | 2 | 1 | SB |
| I. | DEMONSTRATED ABILITY TO REDUCE THE CUSTOMER'S RISK IN DEPLOYMENT | | | H | 4 | 3 | 5 | 3 | 4 | 0 | BC |
| J. | LARGEST NUMBER OF TRAINED DISCRETE MANUFACTURING APPLICATION ENGINEERS WHO ARE ALSO CERTIFIED ASE's ON WINDOWS NT | | | M-H | 5 | | 3 | 3 | 3 | 2 | SB |
| K. | PROGRAM MANAGEMENT CAPABILITIES | | | H | 3 | 2 | 5 | 4 | 5 | 1 | |
| BEST COMBINATIONS | | | | | | | BIG BLUE CORP | BEETOOBEE CORP | BIGFOUR CONSULTING | CLIENT'S OWN IT ORGANIZATION | |
| STRENGTHS AGAINST EACH COMPETITOR | | | | | | | E H AND J | ALL BUT E F AND G | ALL BUT F I AND K | ALL | |

FIG. 9B

| GROUND RULES WHERE WE WIN (116) | GROUND RULES WHERE WE LOSE (118) |
|---|---|
| WE WIN WHEN WE GET THE CUSTOMER TO SEE THE IMPORTANCE OF HAVING ARCHITECTURE, AND HOW OUR WIDE RANGE OF CAPABILITIES COULD BE IMPORTANT TO BUILDING THE RIGHT SOLUTION TO HANDLE BOTH SHORT AND LONG TERM ISSUES | WE LOSE WHEN WE LET THE COMPETITION (ESPECIALLY BEETOOBEE CORP) CONVINCE THE CUSTOMER THAT THEY "DON'T NEED ALL THAT CAPABILITY" ... "JUST START SMALL WITH THIS." IN A SIMILAR FASHION, WE LOSE IF WE LET THE PROSPECT'S OWN IT DEPARTMENT CLAIM THEY CAN "DO WHAT THE COMPANY NEEDS FOR A LOT LESS MONEY." |
| WHEN WE ARE ABLE TO HAVE THE CUSTOMER SEE THAT KNOWLEDGE OF THEIR BUSINESS (MANUFACTURING AND DISTRIBUTION OF DISCRETE PRODUCTS) AND EXPERIENCED IN UNPLEASANT ??? SOLUTIONS IN THAT INDUSTRY ARE VERY IMPORTANT | WHEN WE GOT TO THE IT ORGANIZATION FIRST WITHOUT HAVING THE SUPPORT AND ENTHUSIASM OF THE DIVISION PRESIDENT OR VICE PRESIDENT. (BECOMES TOO EASY FOR IT TO CLAIM THEY "HAVE IT ALL UNDER CONTROL" AND MAKES SELLING AN UPHILL BATTLE). ALSO: WE LOSE WHEN WE FAIL TO INVOLVE IT AFTER GAINING EXECUTIVE SUPPORT FROM THE BUSINESS MANAGER (CAN'T SELL THIS WITHOUT IT'S SUPPORT!) |
| WHEN THE CUSTOMER WOULD PREFER A SUITE OF PRE-EXISTING APPLICATION MODULES THAT ARE BOTH PROVEN AND CUSTOMIZABLE TO MATCH THE CUSTOMER'S REQUIREMENTS | WHEN WE ALLOW THE PROSPECT TO BE SOLD ON THE IDEA THAT "COOKIE CUTTER" (OR STEP AT A TIME) APPROACH IS GOOD ENOUGH |
| SPEED TO BENEFIT IS IMPORTANT, BUT NOT AT THE EXPENSE OF BUILDING SOMETHING THAT WON'T WORK FOR THE LONG HAUL | COMPETITION SELLS UNIX AS THE BEST/ONLY WAY TO IMPLEMENT EXTRANET SOLUTIONS, AND PLACE DOUBTS IN THE MIND OF THE CUSTOMER CONCERNING A WINDOWS NT IMPLEMENTATION. |
| SEE THE BENEFITS OF PROFESSIONAL PROGRAM MANAGEMENT TO LOWER ANY POTENTIAL RISK PRESENTED WITH THE WEB IMPLEMENTATION. | COMPETITION CONVINCES THE CUSTOMER THAT FIKTISHUS IS TOO SMALL AND THAT THEY NEED TO WORK WITH A BIG COMPANY - TOO RISKY TO DO OTHERWISE, AND WE FAIL TO PROPERLY POSITION THE PARTNERSHIP BETWEEN FIKTISHUS AND ABCD ON THIS PROJECT. |
|  | WE FAIL TO PLAN FOR BEETOOBEE'S COMPETITIVE POSITIONING OF THEIR FEATURE RICH PRODUCT (250+ FEATURES IN THEIR OFFERING V87 IN OURS) |

FIG. 10B

| WHAT THESE COMPETITORS WILL STRESS | COMPETITOR 1 | COMPETITOR 2 | COMPETITOR 3 | COMPETITOR 4 |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |

FIG. 11A

| WHAT THESE COMPETITORS WILL STRESS | BIG BLUE CORP | BEETOOBEE CORP | BIGFOUR CONSULTING | CLIENT'S OWN IT ORGANIZATION |
|---|---|---|---|---|
| WILL TRY TO CONVICE THE CLIENT THAT THE UNIX OPERATING SYSTEM IS THE ONLY ONE THAT CAN HANDLE HIGH VOLUME. WILL TRY TO CONVINCE THEM THAT WINDOWS NT SYSTEMS DON'T HAVE THE RELIABILITY REQUIRED. | X | X | X | X |
| WILL CLAIM THEY CAN DO IT BETTER BECAUSE THEY UNDERSTAND THE COMPANY'S INFRASTRUCTURE, POLITICS AND NEEDS BETTER THAN ANY OUTSIDER CAN. | | | | X |
| WILL CLAIM THE PROBLEM CAN BE SOLVED WITHOUT BRINGING IN "YET ANOTHER VENDOR" (WILL OCCUR WHEN THEY ARE ALREADY INVOLVED IN RELATED APPLICATIONS/PROJECTS) | X | | X | X |
| WILL ATTEMPT TO DOWNPLAY THE IMPORTANCE OF A COMPLETE SOLUTION -- "ALL YOU NEED IS THIS ... WHY COMPLICATE THINGS?" | | X | | X |
| WILL LEVERAGE RELATIONSHIP THEY HAVE AT THE HIGHEST LEVELS OF THE ORGANIZATION | X | | X | |
| WILL STRESS THEIR REPUTATION AS THE "E-BUSINESS COMPANY" AND LEVERAGE ALL THE FAVORABLE PRESS THEY HAVE RECEIVED IN THIS AREA | X | | | |
| HAVE SOME MARQUEE ACCOUNTS (FAMOUS NAME) THAT THEY WILL REFERENCE REPEATEDLY | | X | | |
| WILL FOCUS THE CUSTOMER ON BEING ABLE TO DO IT FAR LESS EXPENSIVELY -- "DON'T SPEND A LOT -- JUST GET YOUR FEET WET AND LEARN FROM THE EXPERIENCE BEFORE YOU SPEND A LOT OF MONEY." | | X | | X |
| USE A LONG LIST OF 254 FEATURES FOR THEIR OFFERING, AND COMPARE THAT TO 87 FEATURES ON OURS AND MAKE IT APPEAR THAT WE HAVE SERIOUS PRODUCT SHORT-COMINGS | | X | | |

FIG. 11B

| IDEAL BUYING CRITERIA QUESTIONS | IS IT IMPORTANT TO YOU THAT THE SOLUTION PROVIDER YOU SELECT ... | | | | | | |

124

| DECISION PROCESS QUESTIONS | WHAT IS THE PROCESS THAT YOU WILL USE TO SELECT A VENDOR? WHO, BESIDE YOURSELF, WILL BE INVOLVED IN MAKING A DECISION? IS THERE ANYONE ELSE YOU RECOMMEND I MEET WITH AT THIS POINT? CAN YOU INTRODUCE ME TO HIM/HER? |
|---|---|
| TIME FRAME QUESTIONS | WHEN DO YOU ANTICIPATE MAKING A FINAL DECISION? WHAT IS THE TARGET FOR DELIVERY AND INSTALLATION? BASED ON THAT, WHEN WOULD YOU LIKE TO BEGIN THE IMPLEMENTATION? |
| BUDGET QUESTIONS | IS THERE A BUDGET ESTABLISHED FOR THIS PROJECT? WHERE WILL THE FUNDING COME FROM? HOW DO YOU SECURE FUNDING IN EXCESS OF THE BUDGET? |

FIG. 12A

| IDEAL BUYING CRITERIA QUESTIONS | IS IT IMPORTANT TO YOU THAT THE SOLUTION PROVIDER YOU SELECT .... |
|---|---|
| | HAS THE ABILITY TO PUT TOGETHER A SMALL WORKING MODEL IN ABOUT 4 WEEKS AT A FIXED PRICE THAT COULD HELP YOU DEVELOP A VISION OF HOW SUCH A SYSTEM COULD WORK IN YOUR ENVIRONMENT? |
| | CAN PROVIDE A SUITE OF PRE EXISTING APPLICATION MODULES THAT ARE CUSTOMIZABLE TO MATCH YOUR REQUIREMENTS? |
| | CAN PROVIDE YOU WITH A SOLUTION THAT WILL MAXIMIZE YOUR CHOICES IN TECHNOLOGIES YOU CAN ADOPT AS YOU MOVE INTO THE FUTURE? |
| | HAS A PROVEN TRACK RECORD IN PROJECT MANAGEMENT (PLANNING AND DESIGNING THROUGH TO IMPLEMENTATION AND AFTER SALE SUPPORT)? |
| | HAS SPECIFIC EXPERTISE IN YOUR INDUSTRY? |

124

| DECISION PROCESS QUESTIONS | WHAT IS THE PROCESS THAT YOU WILL USE TO SELECT A VENDOR? WHO, BESIDE YOURSELF, WILL BE INVOLVED IN MAKING A DECISION? IS THERE ANYONE ELSE YOU RECOMMEND I MEET WITH AT THIS POINT? CAN YOU INTRODUCE ME TO HIM/HER? |
|---|---|

126

| TIME FRAME QUESTIONS | WHEN DO YOU ANTICIPATE MAKING A FINAL DECISION? WHAT IS THE TARGET FOR DELIVERY AND INSTALLATION? BASED ON THAT, WHEN WOULD YOU LIKE TO BEGIN THE IMPLEMENTATION? |
|---|---|

128

| BUDGET QUESTIONS | IS THERE A BUDGET ESTABLISHED FOR THIS PROJECT? WHERE WILL THE FUNDING COME FROM? HOW DO YOU SECURE FUNDING IN EXCESS OF THE BUDGET? |
|---|---|

| 132 | |
|---|---|
| SILVER BULLETS | WHAT ARE THE SILVER BULLETS OF THE OFFERING? |
| | CAN PROVIDE A SUITE OF PRE-EXISTING APPLICATION MODULES THAT ARE CUSTOMIZABLE TO MATCH THE CUSTOMER'S REQUIREMENTS |
| | LARGEST NUMBER OF TRAINED DISCRETE MANUFACTURING APPLICATION ENGINEERS WHO ARE ALSO CERTIFIED ASE'S ON WINDOWS NT |

| 134 | |
|---|---|
| BEST COMBINATIONS | WHAT ARE THE BEST COMBINATIONS? |
| | EXPENSE IN DEVISING SOLUTIONS SPECIFICIALLY FOR THE DISCRETE MANUFACTURING INDUSTRY |
| | END-TO-END SERVICES CAPABILITIES (FROM ARCHITECTURAL PLANNING & DESIGN TO AFTER-SALE SUPPORT) |
| | RAPID DEVELOPMENT AND DEPLOYMENT CAPABILITIES (DONE IN A VERY SHORT TIME FRAME AT A FIXED COST) |
| | DEMONSTRATED ABILITY TO REDUCE THE CUSTOMER'S RISK DURING DEPLOYMENT |

| 136 | |
|---|---|
| FOCUSED MESSAGES | WHAT ARE THE FOCUSED MESSAGES? |
| | FIKTISHUS AND LARCO EMPLOYEES HAVE THE RIGHT TECHNICAL SKILLS TO DESIGN AND IMPLEMENT AN EXTRANET SOLUTION THAT DOES WHAT THE CUSTOMER WANTS |

FIG. 13B

| 138 — WE ARE UNIQUE IN THIS MARKET BECAUSE ... | 140 — WE ARE A STRONG SUPPLIER IN THIS MARKET BECAUSE ... |
|---|---|
| WE HAVE THE LARGEST NUMBER OF CONSULTANTS FOR THIS TYPE OF APPLICATION WHO NOT ONLY KNOW THE TECHNOLOGY BUT UNDERSTAND THE MANUFACTURING BUSINESS. THIS MEANS WE CAN DO A BETTER JOB OF TAILORING SYSTEMS TO MEET THE UNIQUE NEEDS OF MANUFACTURING FIRMS. | WE HAVE EXPERTISE IN DISCRETE MANUFACTURING, AND IN PLANNING, DESIGNING, IMPLEMENTING AND SUPPORTING THESE APPLICATIONS. |
| OUR COMPANY HAS A SUITE OF PRE-EXISTING APPLICATION MODULES THAT ARE CUSTOMIZABLE TO THE USER'S NEEDS AND ENVIRONMENT. THE FACT THAT THE PRE-EXISTING MODULES EXIST SAVES TIME IN IMPLEMENTATION BECAUSE SOLUTIONS DON'T HAVE TO BE BUILT FROM SCRATCH. THE FACT THAT THEY ARE CUSTOMIZABLE MEANS THAT OUR CLIENTS ARE ABLE TO CREATE A CUSTOMIZED ENVIRONMENT TO CREATE A COMPETITIVE ADVANTAGE. | UNLIKE MOST OTHER COMPETITORS, FIKTISHUS IS ABLE TO COMPLETE A RAPID DEVELOPMENT AND DEPLOYMENT OF TRIAL SYSTEMS IN A VERY SHORT TIME FRAME AT A FIXED PRICE. THIS ALLOWS CUSTOMERS TO MINIMIZE THEIR IMPLEMENTATION RISK AND ENSURES THAT THE RESULTING SOLUTION WORKS AS INTENDED. |
|  | OUR COMPANY HAS A TRACK RECORD OF PLANNING AND DOUBLE-CHECKING ALL ASPECTS OF A PLAN AS IT IS ROLLED OUT TO MINIMIZE RISK. |

- 142: WHO I AM? (SALES PERSON'S PERSONAL INTRODUCTION)
- 144: WHO I REPRESENT?
- 146: HOW OUR COMPANY DIFFERENTIATES ITSELF?
- 148: HOW YOU MIGHT POSSIBLY BENEFIT BY SELECTING OUR COMPANY AS YOUR BUSINESS PARTNER?

| | |
|---|---|
| A | |
| B | |
| C | |

WHO I AM? (SALES PERSON'S PERSONAL INTRODUCTION) — 142

WHO I REPRESENT? — 144

| | |
|---|---|
| A | THE COMPANY I WORK FOR, FIKTISHUS CORPORATION... IS A LEADING SUPPLIER OF INTERNET SOLUTIONS USE TO LINK BUSINESSES TOGETHER |
| B | MAJOR AUTOMOTIVE AND COMMUNICATIONS MANUFACTURERS USE OUR SYSTEMS TO IMPROVE CUSTOMER SATISFACTION AND LOYALTY BY MAKING THEIR CUSTOMERS TO SELECTED INFORMATION IN THEIR ERP AND OTHER SYSTEMS |
| C | AS PART OF OUR ON-GOING COMMITMENT TO MANUFACTURERS, WE HAVE BEEN LOOKING FOR WAYS TO HELP MANUFACTURERS IMPROVE THE COSTS AND EASE OF DEALING WITH THEIR COMPLEX DISTRIBUTION CHANNELS |

HOW OUR COMPANY DIFFERENTIATES ITSELF? — 146

| | |
|---|---|
| A | WE DIFFERENTIATE OURSELVES IN THIS MARKET THROUGH OUR COMMITMENT TO SELECTING BEST IN BREED PARTNERS TO DEVELOP EFFECTIVE SOLUTIONS FOR MANUFACTURERS |
| B | ABCD IS ONE SUCH COMPANY THAT WE HAVE SELECTED SPECIFICALLY FOR ENTERPRISE CHANNEL MANAGEMENT BECAUSE OF THEIR PROVEN TRACK RECORD IN DEVELOPING AND DEPLOYING THESE TYPES OF SOLUTIONS |
| C | TOGETHER, WE HELP CUSTOMERS MANAGE RISK, AND ENSURE THAT THE SOLUTIONS WE DEVELOP ARE EXTREMELY RELIABLE, AND PERFORM AS EXPECTED WITHOUT IMPACTING OTHER APPLICATIONS |

HOW YOU MIGHT POSSIBLY BENEFIT BY SELECTING OUR COMPANY AS YOUR BUSINESS PARTNER? — 148

| | |
|---|---|
| A | CUSTOMERS HAVE TOLD US THAT WE HAVE HELPED THEM... INCREASE THEIR FINANCIAL PERFORMANCE AND IMPROVE BRAND LOYALTY THROUGH THE SOLUTIONS WE DEPLOY |
| B | AS AN EXAMPLE, ONE CUSTOMER INCREASED THEIR SALES OF HIGH MARGIN SPARE PARTS BY OVER 30% |
| C | AND IN ANOTHER SITUATION, A CUSTOMER INCREASED THEIR CALL CENTER EFFECTIVENESS CONSIDERABLY BY MAKING THEIR CUSTOMER ORDER STATUS INFORMATION AVAILABLE OVER THE INTERNET. THEY FOUND THAT THIS ONE CAPABILITY ALONE REDUCED THEIR CALL CENTER ACTIVITY BY 20% WHILE IMPROVING CUSTOMER SATISFACTION... |

FIG. 14B

SYSTEM AND METHOD FOR DEVELOPING SALES CONTENT

RELATED APPLICATION

This application is a divisional of U.S. application Ser. No. 10/742,628, filed Dec. 19, 2003, now U.S. Pat. No. 7,449,870, issued on Mar. 3, 2009. The entire teachings of the above application is incorporated herein by reference.

BACKGROUND

Selling is considered to be both a science and an art. Selling as a science falls into three general categories. The first general category is scientific research in human communication and how people learn and retain information, psychology, neuroscience, and human achievement. The second general category is processes—identifying the processes to identify qualified prospects, to conduct thorough and accurate customer needs assessments, to effectively engage sales support resources, to develop customer centered solutions, and finally the process to negotiate and close the sale. The third general category is best practices—identifying the best practices of the top sales performers. The marketing organization in any company is generally responsible for providing the sales channels with the science of "who to sell" and "how to sell" information for each product or service offering. The sales channel is responsible for implementing the selling information provided by marketing.

The art of selling is in the application of the "science" or selling information provided by marketing to the sales channel. As in any discipline, the individual who knows the most science is able to do the most with their art. As a result, marketing plays a vital role in helping the sales channel excel in the art of selling.

Almost every company has a marketing plan that focuses on the needs of the customer in the marketplace. The marketing plan identifies target markets, potential revenue, and the types of products, services, and solutions that a company must produce to meet or exceed customer expectations. Marketing plans also frequently include a messaging strategy and some discussion of how the company's offerings will be publicized or promoted within the target markets.

As new offerings are released, the sales channel is provided with product and industry training which typically focuses on the features and benefits of the offering. After the sales channel completes the product and industry training they are expected to sell the new offering based on the information provided by marketing.

Most companies also have a sales strategy. The sales strategy identifies the sales channels needed to effectively sell the offering. It also describes how territories and quotas will be established to meet the revenue projections outlined in the marketing plan. As part of the sales strategy, besides providing the sales channel with industry and product training, it is also necessary to identify the competencies and sales skills needed by each sales person to effectively close business. Various sales skills training programs are usually provided on an ongoing basis with programs focused on a single skill or group of skills. After the sales channel completes sales skill training, they are expected to use these skills to meet the sales revenue quotas outlined in the marketing plan.

What is missing in traditional marketing plan and sales strategy implementation is the integration of information learned in product and industry training with the randomly acquired sales skills training. As a result, each sales person often must devote a significant amount of time trying to integrate industry and product data with randomly acquired sales skills into useable selling information for every product, service, or solution.

With individuals in the sales channel having to develop selling information on their own, the selling information is usually incomplete or inaccurate; it can be extremely difficult to identify, share, and leverage best practices; and productivity is diminished because the sales person spends more time preparing for sales calls and less time face to face selling. The individual sales person approach to develop selling information results in longer sales cycles, lower closing ratios, and higher costs of sale.

The type of selling information that marketing organizations typically provide to the sales channels usually falls into three general categories of information: "what to sell" information, "who to sell" information, and "how to sell" information. It is estimated that over 80% of the information that marketing typically provides to the sales channel is in the "what to sell" information category. Some examples may include: What are the performance characteristics? What is the industry information? What are the pricing guidelines? What are the promotional activities? What type of marketing literature will be available, and what are the features and benefits of the offering?

Marketing organizations usually are good at providing this important "what to sell" information. Unfortunately, "what to sell" information does not drive sales productivity. The sales channel needs to know who is best suited for the offering and how to sell the offering to them. Quality "who to sell" and "how to sell" information is needed by the sales channel to effectively implement marketing plans and sales strategies.

SUMMARY

The absence of quality "who to sell" and "how to sell" information and a common sales communication language is one reason why there is often a "disconnect" between marketing and the sales channel. Thus, there is a need for improvements that can help bridge the gap between the traditional marketing plan and sales strategy implementation in organizations. The present approach provides a system and method that allows marketing organizations to provide quality selling information that can help sales channels to quickly locate the best prospects for each offering and information on how to effectively close sales.

An advantage of the present system and method is that it allows companies to develop and implement marketing plans as an organization, rather than as individuals or separate business units. According to one aspect, a process is provided that enables product development, marketing and sales personnel to develop quality "who to sell" and "how to sell" information for one or more sales channels for product and service offerings. In an embodiment, the quality selling information is developed through a series of interrelated templates of a sales guide.

Another aspect relates to how the sales channel uses this quality selling information to develop and document customer needs assessments. Yet another aspect is directed to providing feedback from the sales channel to the marketing organization to update and refine the quality selling information included in the sales guide based on interaction with one or more customers of the product or service offering.

Accordingly, a method of developing sales information for use in a buyer-seller environment includes providing one or more qualifiers which relate to a sales offering; determining value criteria, for each qualifier, to identify potential value of the sales offering; determining ideal buying criteria based on a competitive analysis; and developing the sales information from the value and buying criteria. The sales information, which can be a letter of understanding (LOU) or a buyer needs assessment, can be stored on a server and updated and accessed by one or more sellers. The updating can be an iterative process that is responsive to feedback about the sales information.

According to another aspect, a system for developing a customer needs assessment includes a qualifier template identifying at least one qualifier pertaining to a sales offering; a value template coupled to the qualifier template, the value template including at least one of the qualifiers from the qualifier template; a competitive analysis template providing ideal buying criteria in connection with the sales offering; and customer needs assessment data including output from the value template and the competitive analysis template. The templates interrelate to define a sales guide. The system further includes a server for storage and retrieval of the sales guide and customer needs assessment data or LOU.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A illustrates an embodiment of a customer engagement model template.

FIG. 2B illustrates the template of FIG. 2A with sample information.

FIGS. 5B and 5C illustrate the template of FIG. 5A with sample information.

FIG. 6A illustrates an embodiment of a value questions template.

FIGS. 6B, 6C and 6D illustrate the template of FIG. 6A with sample information.

FIG. 7A illustrates an embodiment of an anticipated objections template.

FIGS. 7B and 7C illustrate the template of FIG. 7A with sample information.

FIG. 8A illustrates an embodiment of a return on investment (ROI) spreadsheet template.

FIG. 8B illustrates the template of FIG. 8A with sample information.

FIG. 9B illustrates the template of FIG. 9A with sample information.

FIG. 10B illustrates the template of FIG. 10A with sample information.

FIG. 11A illustrates an embodiment of a competitive tactics template.

FIG. 11B illustrates the template of FIG. 11A with sample information.

FIG. 12A illustrates an embodiment of a probability questions template.

FIG. 12B illustrates the template of FIG. 12A with sample information.

FIGS. 13B and 13C illustrate the template of FIG. 13A with sample information.

FIG. 14A illustrates an embodiment of a two-minute drill template.

FIG. 14B illustrates the template of FIG. 14A with sample information.

DETAILED DESCRIPTION

Figure 1:
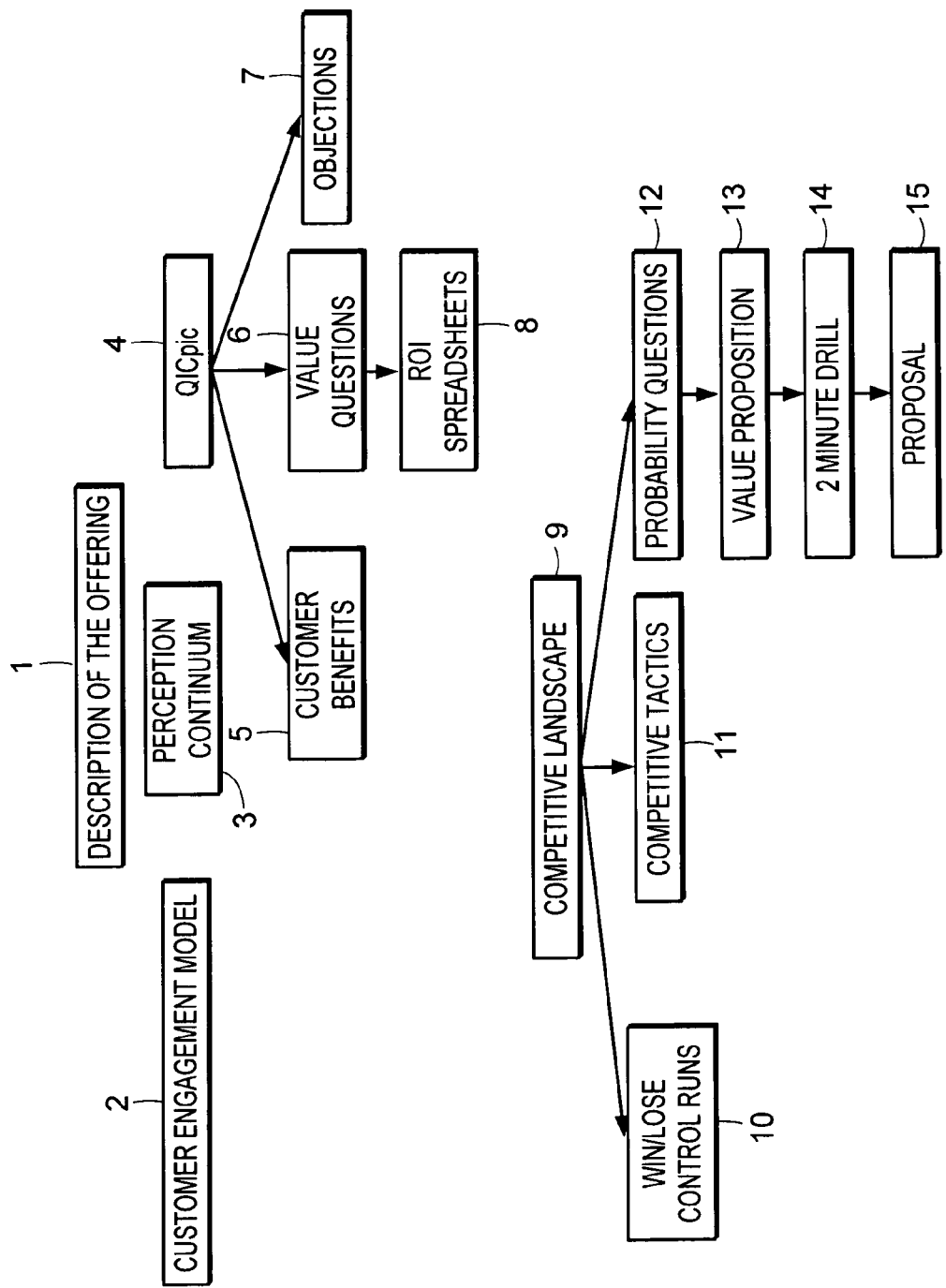
FIG. 1 illustrates a process for developing quality selling information using information templates.

The present system and method relates to improvements for developing quality selling information with respect to product and service offerings for use by sales channels to provide customer needs assessments. The present approach employs a series of interrelated templates to develop the quality selling information.

An embodiment of a process for developing quality selling information in the form of a sales guide is now described with reference to FIG. 1. The process shown includes the following templates: description of the offering template 1, customer engagement model template 2, perception continuum template 3, QICpic or ideal customer profile template 4, customer benefits template 5, value questions template 6, anticipated objections template 7, return on investment (ROI) spreadsheet template 8, competitive landscape template 9, win/lose ground rules template 10, competitive tactics template 11, probability questions template 12, value proposition template 13, two-minute drill template 14, and proposal template 15. The relationships between the templates and the respective roles in developing the quality information will be apparent from the following description of the individual templates. It should be understood that not all of the templates described herein are required to be used to develop a sales guide. It should also be understood that the process described is useful for developing a variety of sales guides, each tailored for one or more product or service offerings. Use of the developed sales guides by sales persons to document customer needs assessments is described further herein.

The description of the offering template 1 provides the sales channel with a succinct overview of the offering. The customer engagement model template 2 provides the sales channel with the steps of sale, as well as tools and resources available at each step of sale to quickly and profitably close the sale. The perception continuum template 3 describes where the company and the offering are viewed in the marketplace.

The QICPic or ideal customer profile template 4 helps the sales channel quickly identify prospects that would benefit most by purchasing the offering. The ideal customer profile is also used to develop quality selling information including positive and negative qualifiers that are used in a messaging process described further herein.

As shown in FIG. 1, the customer benefits, value questions and anticipated objections templates 5, 6, 7 link from the QICpic template 4. The customer benefits template 5 helps the sales channel identify the primary and secondary contacts that would benefit most by purchasing the offering. The value questions template 6 provides the sales channel with questions that will help to uncover the value of an offering, based on positive qualifiers identified in the QICpic template 4. The anticipated objections template 7 provides the sales channel with answers to anticipated objections and customer misunderstandings, based on negative qualifiers identified in the QICpic template 4. The ROI template 8, linked from the value questions template 6, helps the sales channel quantify the value of an offering for the customer.

Having briefly described the templates and their relationships, the following describes in further detail aspects of the templates. In addition, the templates are described in relation to an example offering that illustrates the operation of the system and method for develop quality selling information.

As noted above, the description of the offering template 1 (FIG. 1) provides a brief overview of the offering for the sales channel. The description of the offering includes information concerning details of the product or service offering and how the offering helps customers. The following is an example description of the offering that is used throughout the specification to illustrate the present system and method:

| Description of the Offering | |
| --- | --- |
| What it is | How it helps customers |
| The Fiktishus Web Management solution employs a suite of both existing and unreleased Fiktishus software (under the Code Name: XYZ) in an entirely new configuration. The offering from Fiktishus is being augmented by services from our new implementation partner, ABCD company. ABCD is the largest and most well-known services organization when it comes to implementing web-based extranet solutions for business-to-business applications. This partnership allows us to leverage our ability to develop customized solutions built on an architecture that will serve the customer for many years to come. The XYZ offering consists of analysis software; intruder detection software; customizable user interface; and transaction management software. All applications run on Windows NT platforms. ABCD will be providing services which include: Architectural planning and design Application planning & design Installation Implementation And on-going support | This solution provides customers with a competitive edge by helping them consolidate operations and link to their global network of distributors and dealers for the products they manufacture. Each prospect for this offering will not only be able to link to their trading partners (who might supply raw materials and other critical components) but also provides a direct link to the ultimate end user of the product. End users and trading partners will both have access to use a well-designed and easy-to-navigate site tailored to their language, locale, and business practices. Partners and end users will be able to: Enter or acknowledge orders Track order status Track delivery progress Track payments and review warranty and service status Best of all, the only technology investment their partners and end-users need is access to an Internet browser. With this new solution, we anticipate that our clients can grow closer to their customers, and enable suppliers to provide direct consumer access. This offering is part of our strategy to build a foundation for effective business-to-business and business-to-consumer marketing. |

The competitive landscape template 9 provides the sales channel with a comparison of the strengths and weaknesses of an offering against competitive alternatives. The competitive landscape is also used to create quality selling information in the messaging process. The win/lose ground rules template 10 identifies criteria relating to reasons why sales are typically won and lost. The competitive tactics template 11 provides the sales channel with tactics competitors may use to position their offerings against the client offerings. The probability question template 12 provides the sales channel with questions that can help determine the probability of eventually closing a sale. In particular, the capabilities of the client offering in the competitive landscape template 9 that are ranked higher than competitive offerings are used to develop ideal buying criteria queries or probability questions. In addition, the ranked capabilities from the competitive landscape 9 are used to develop the value proposition template 13.

The two-minute drill template 14 provides the sales channel with an opening sales presentation that can quickly earn the trust and confidence of the customer. The proposal template 15 saves the sales channel time in developing and assembling sales proposals.

The purpose of the customer engagement model template 2 (FIG. 1) is to provide the sales channel with the steps of sale and sales support resources necessary to quickly and profitably guide customers through the sales process and it is usually unique for each offering. This section describes how to develop a unique sales process for every offering. An embodiment of a customer engagement model template 2 is shown in FIG. 2A. The template 2 includes sections directed to steps 40, average time between 42, number of days to agreement 44, probability of closing at each step 46, and resources and tools available 48. While the template is shown with ten steps, there is no limitation on the number of steps that may be included in the template. A customer engagement model template 2 with sample information for the illustrative example is shown in FIG. 2B.

Figure 3:
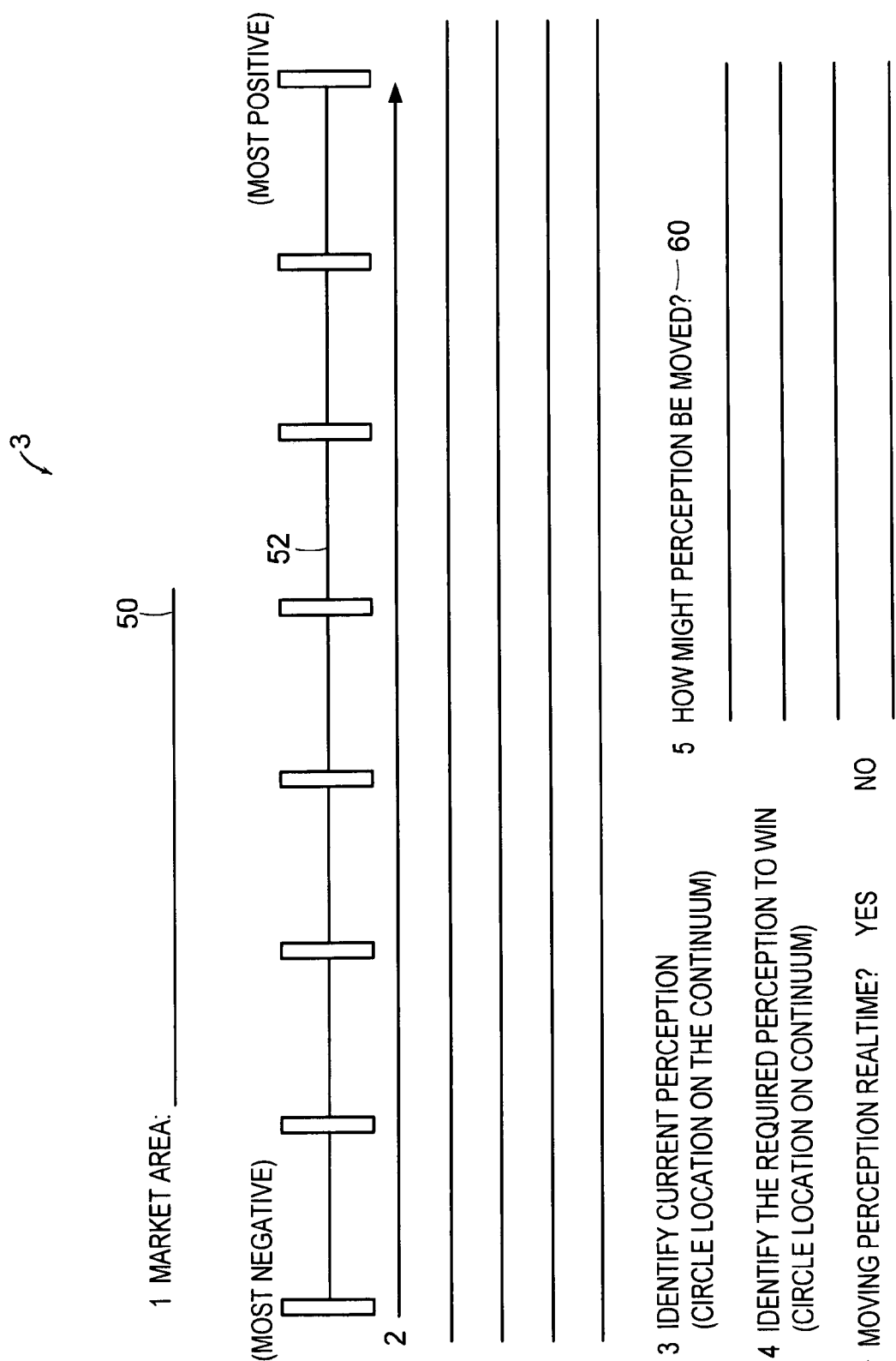
FIG. 3 illustrates an embodiment of a perception continuum template.

As noted above, the perception continuum template 3 (FIG. 1) describes where the company and the offering are viewed in the marketplace. An embodiment of a perception continuum template 3 is shown in FIG. 3. The template 3 includes a section directed to identifying market area 50 and a continuum bar 52 having hash indicia representing a range from most negative perception at one end to most positive perception at the other end.

Section 54 instructs a user to identify current perception by indicating with a marking, e.g., a circle, on the continuum bar 52. Section 56 instructs the user to identify with another marking on the bar 52 the perception viewed as being required to win in the marketplace. At section 58, the user is instructed to assess whether moving from the current perception to the required perception is realistic. Section 60 provides an area for the user to indicate how such perception might be moved.

Figure 4A:
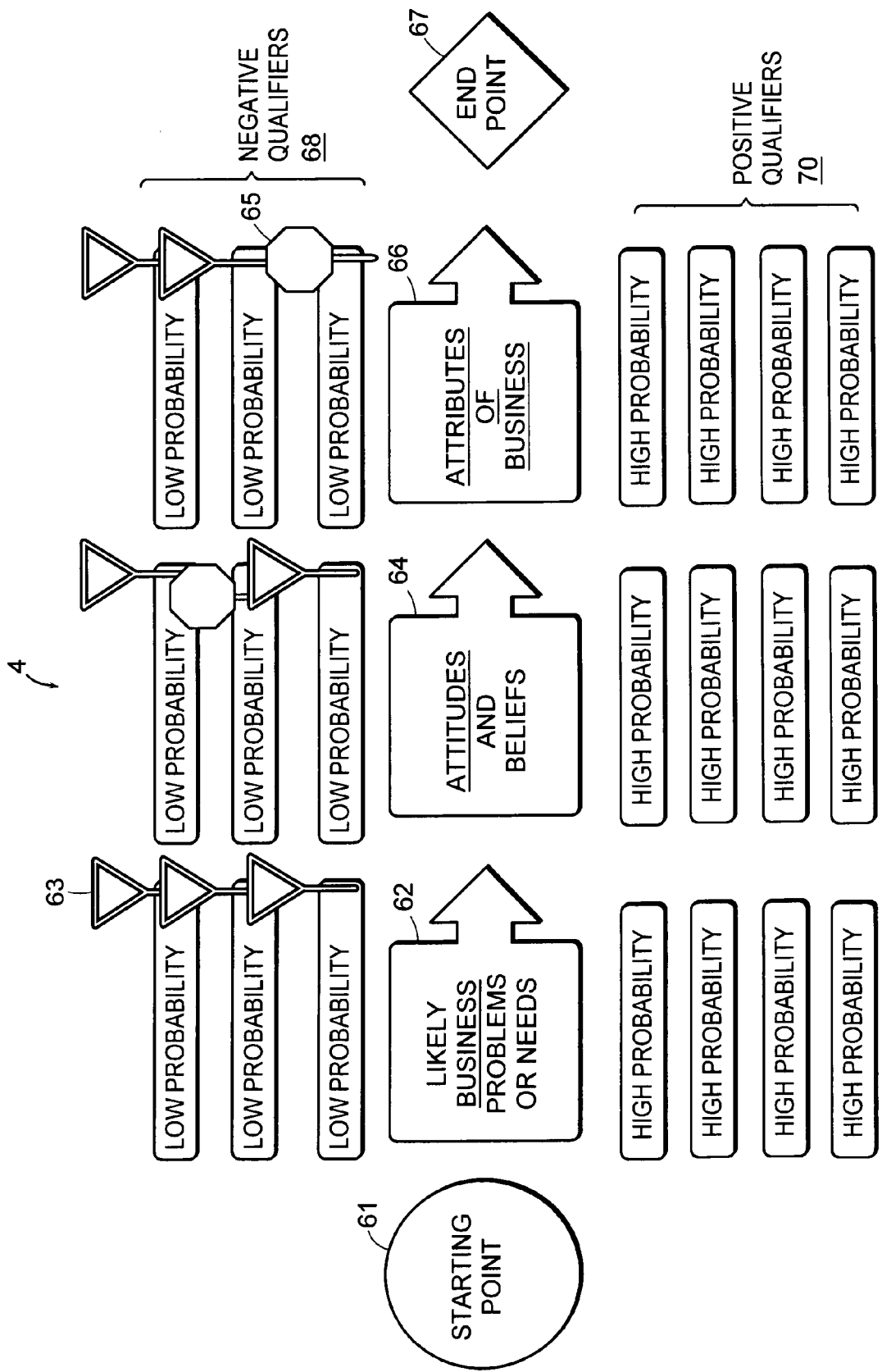
FIG. 4A illustrates an embodiment of a QICpic or ideal customer profile template.

The QICpic template 4 (FIG. 1) is designed to help the sales channel identify qualified prospects. It enables users to develop an understanding of the ideal customer profile. An embodiment of a QICpic template 4 is shown in FIG. 4A. The template 4 includes a starting point 61 and ending point 67 selected for prospect qualification. Preferably, the starting point 61 should be clear, measurable and easily understandable. The ending point 67 is typically a closed sale; however, it might also represent a pilot program, site visit, or other defined end point.

The QICpic template 4 is divided into three assessment benchmark categories: likely business problems or needs 62, attitudes and beliefs 64, and attributes of the business 66. There are three process steps for each assessment benchmark category. This three step process consists of category identification and the listing of positive qualifiers 70 and negative qualifiers 68 for each assessment benchmark category.

In the first assessment benchmark category 62, the first step is to identify the likely customer problems and needs. Next is to list positive qualifiers 70 for the likely customer problems and needs. The third step is to list the negative qualifiers 68 for the likely customer problems and needs and to categorize the negative qualifiers as either "cautions," represented in FIG. 4A as a yield sign 63, or "show-stoppers," represented as a stop sign 65.

In the second assessment benchmark category 64, the first step is to identify the attitudes and beliefs. The second step is to list positive qualifiers 70 for the attitudes and beliefs. The third step is to list the negative qualifiers 68 for the attitudes and beliefs and to categorize the negative qualifiers as either "cautions" 63 or "show-stoppers" 65.

Similarly, in the third assessment benchmark category 66, the first step is to identify the business attributes. Next is to list positive qualifiers 70 for the business attributes. The third step is to list the negative qualifiers 68 for the business attributes and to categorize the negative qualifiers as either "cautions" 63 or "show-stoppers" 65.

Ideally, the information used to create the QICpic template is gathered with input from other members of the marketing team, as well as from the sales organization. Also, the QICpic is most easily developed using a template developed in Microsoft PowerPoint. Preferably, the QICpic template is updated on a regular basis to reflect changes in the business environment and/or input from the sales channel.

Figure 4B:
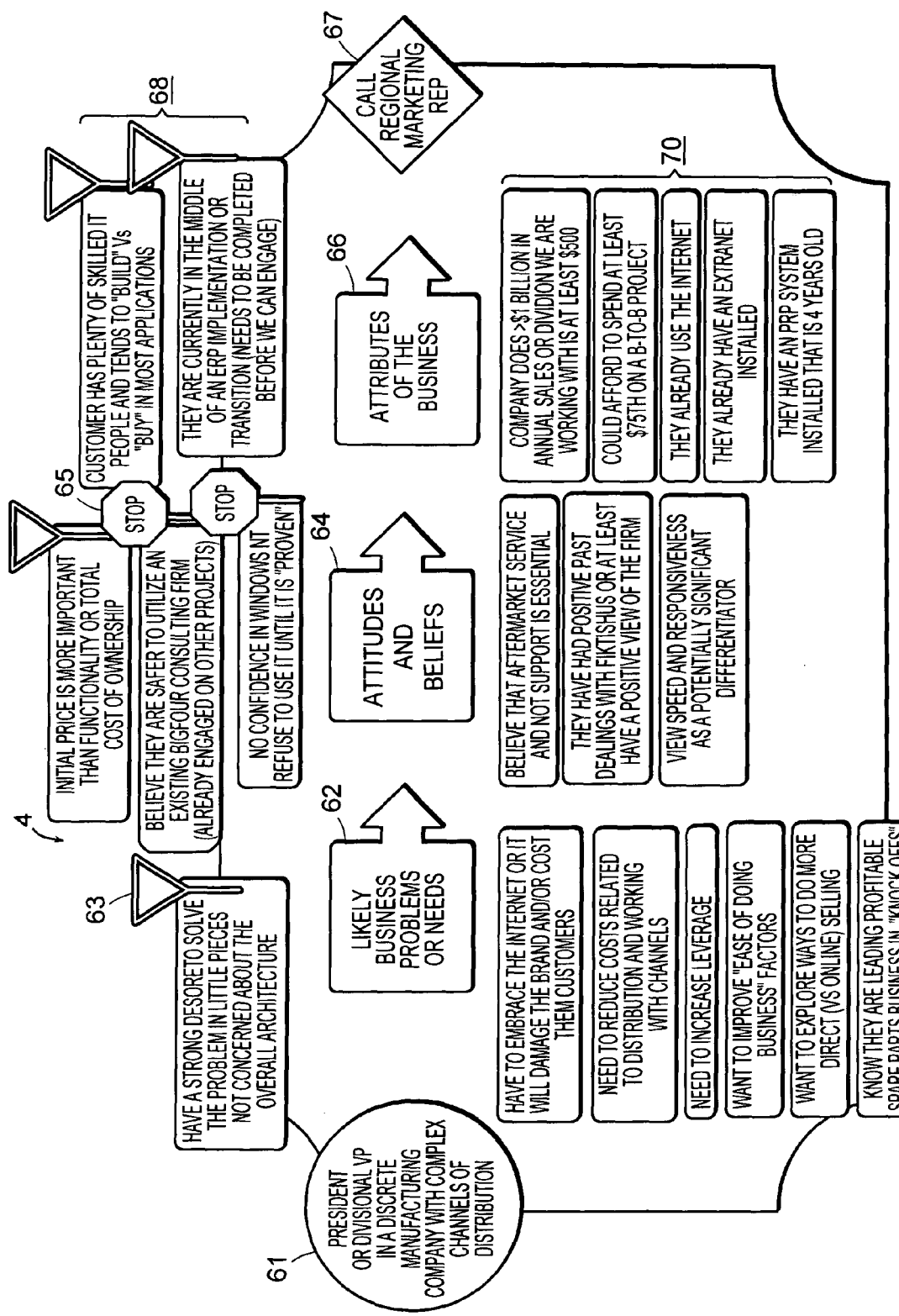
FIG. 4B illustrates the template of FIG. 4A with sample information.

A QICpic template with sample information for the illustrative example is shown in FIG. 4B. In this example, the starting point 61 identifies a contact person or level at a particular type of customer. The ending point 67 in this example identifies a particular action, i.e., contacting a regional marketing representative.

Figure 5A:
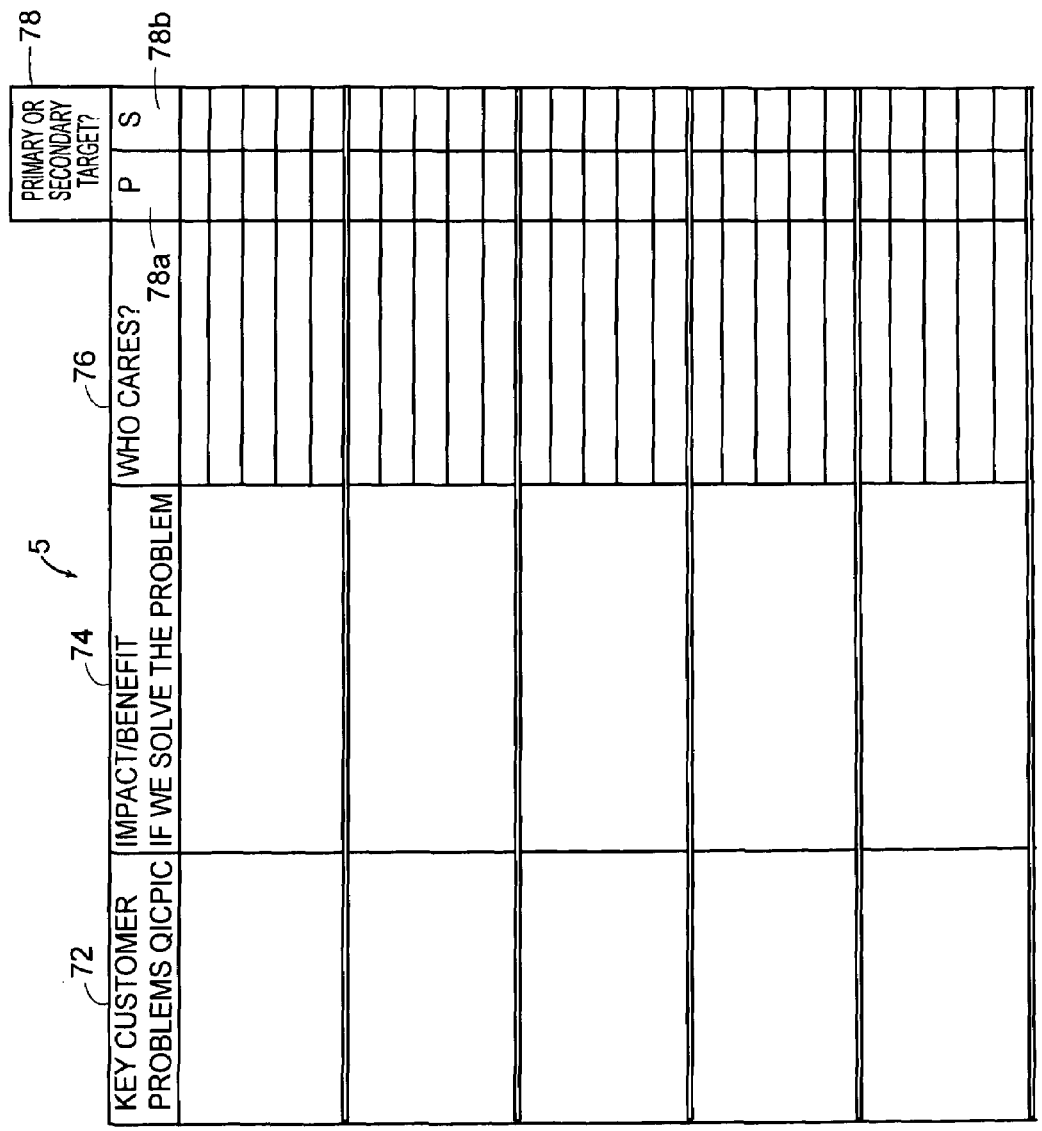
FIG. 5A illustrates an embodiment of a customer benefits template.

The customer benefits template 5 (FIG. 1) is directed to helping the sales channel identify the primary and secondary contacts that would benefit most by purchasing the offering. An embodiment of a customer benefits template 5 is shown in FIG. 5A. The template includes sections directed to identifying key customer problems 72, impact/benefit of solving problem 74, those persons, functions or organizations that care about the problem and solution 76, and whether the identified person, function or organization is a primary target 78a or a secondary target 78b. The primary contacts are those contacts that may have a vested interest in any decisions made affecting the offering and likely would be closely involved in making such decisions or approving a purchase. The secondary contacts are those contacts that may have a vested interest in any decisions made with respect to the offering, may play a role in the decision process (e.g., may recommend which vendor to select or may be an end user), but probably do not make the final decision or give final approval to the purchase. Information identified in the key customer problems section 72 can be derived from information identified in the QICpic template 4 (FIG. 4A).

A customer benefits template that includes sample information based on the illustrative example is shown in FIGS. 5B and 5C. As shown, for each key customer problem 72 identified, the impact/benefit is indicated in section 74. The template also indicates in section 76 a listing of persons, functions or organization that likely may be concerned with the identified problem and solution. At section 78 there is a marking to indicate whether the identified person is a primary target 78a or secondary target 78b.

The value questions template 6 (FIG. 1) helps the sales channel uncover the value of the offering for each prospect. In particular, the positive qualifiers 70 in the QICpic template 4 (FIG. 4A) are used to develop questions that help the sales person uncover the potential value of the offering. The value questions are developed to help the sales channel identify the prospect's current business environment, desired result of need, and the impact or ROI of change. An embodiment of the value questions template 6 is illustrated in FIG. 6A.

The first column of the template consists of the key qualifiers 80 for an offering based on the positive qualifiers 70 from the QICpic template 4 (FIG. 4A). The remaining four columns include queries directed to opening questions 82, current situation 84, desired result 86 and impact 88. Development of these queries requires two elements, namely, using opened ended questions and ensuring that no value judgments are implied in the question. A value questions template that includes sample information based on the illustrative example is illustrated in FIGS. 6B through 6D.

The anticipated objections template 7 (FIG. 1) provides the sales channel with answers to common customer objections or misunderstandings. In particular, the negative qualifiers 68 in the QICpic template 4 (FIG. 4A) are used to develop answers to anticipated customer objections. An embodiment of the anticipated objections template 7 is shown in FIG. 7A.

The first column of the template is directed to listing the anticipated objections 90. The second column pertains to the underlying question 92 in relation to the anticipated objection denoted in the first column 90. In the third column are listed answers and explanations 94 corresponding to the underlying question in the second column 92. Sample information based on the illustrative example for the anticipated objections template is shown in FIGS. 7B and 7C.

The Return on Investment (ROI) spreadsheet template 8 (FIG. 1) provides a format to quantify the potential value of an offering. The ROI templates can be developed from the customer feedback provided from output of the value questions template 6 (FIG. 6A). In particular, this is achieved by analyzing each impact question 88 on the value questions template 6. Since every offering has different variables, the ROI templates are generally customized and tailored for each offering. An embodiment of an ROI template 8 pertaining to an offering aspect relating to a new hire ramp up is illustrated in FIG. 8A. Application of the example template to analyze three different exemplary scenarios is shown in FIG. 8B.

Figure 9A:
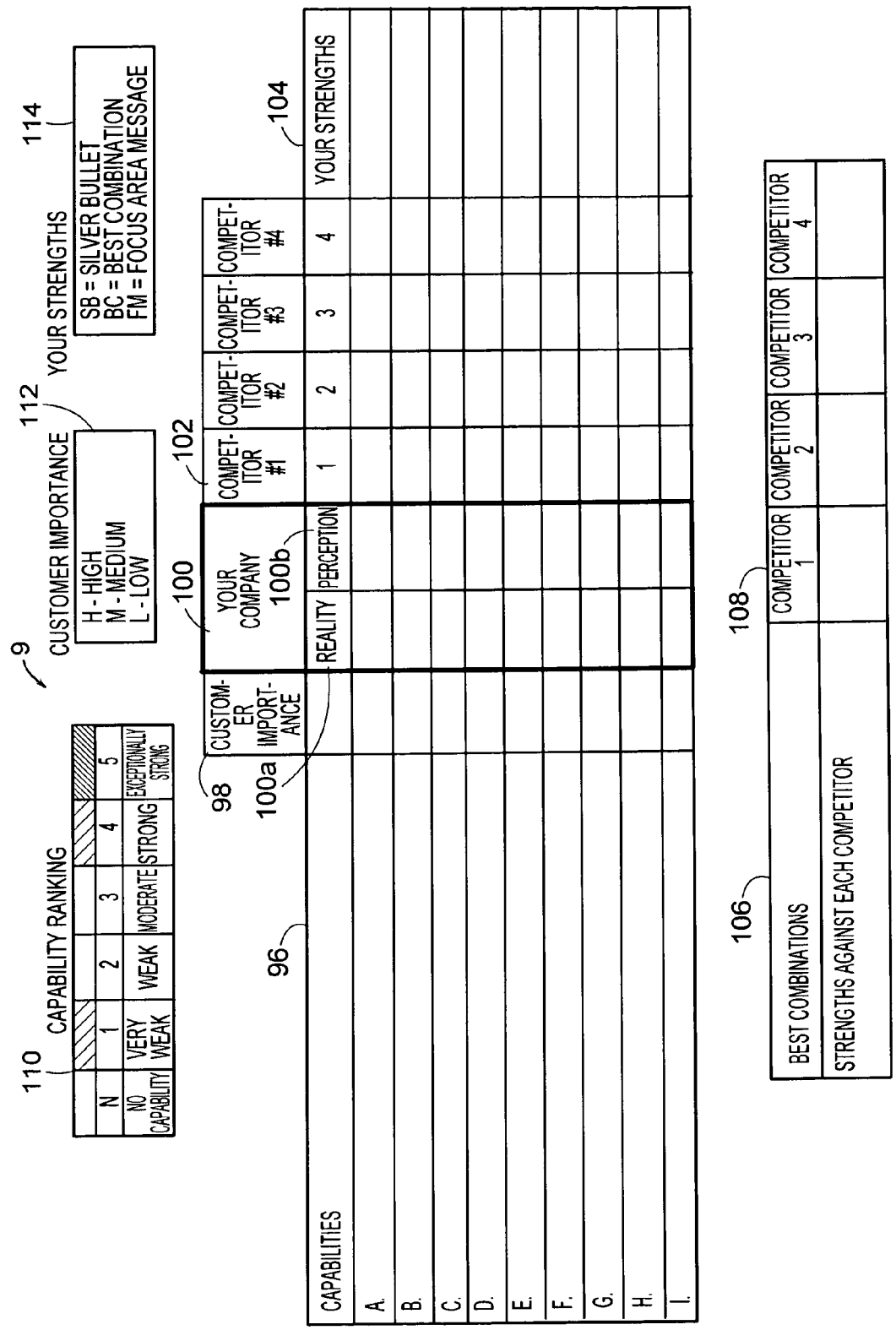
FIG. 9A illustrates an embodiment of a competitive landscape template.

The competitive landscape template 9 (FIG. 1) provides the sales channel with a comparison of the strengths and weaknesses of an offering against the alternatives. An embodiment of the template is illustrated in FIG. 9A. The template includes a first column 96 for listing capabilities. For each of these capabilities a ranking of customer importance is indicated in column 98 based on a customer importance scale 112 of high, medium, and low. In column 100 for each capability the user indicates respective reality and perception measures 100a, 100b for the offering company based on a capability ranking scale 110. Likewise, for one or more competitors of the offering company listed in successive columns 102, the capabilities are ranked using the same ranking scale 110. In column 104 the user can indicate a quality of strength for the offering company for one or more of the capabilities based on a strength type 114. A competitive landscape template that includes sample information based on the illustrative example is illustrated in FIG. 9B.

Figure 10A:
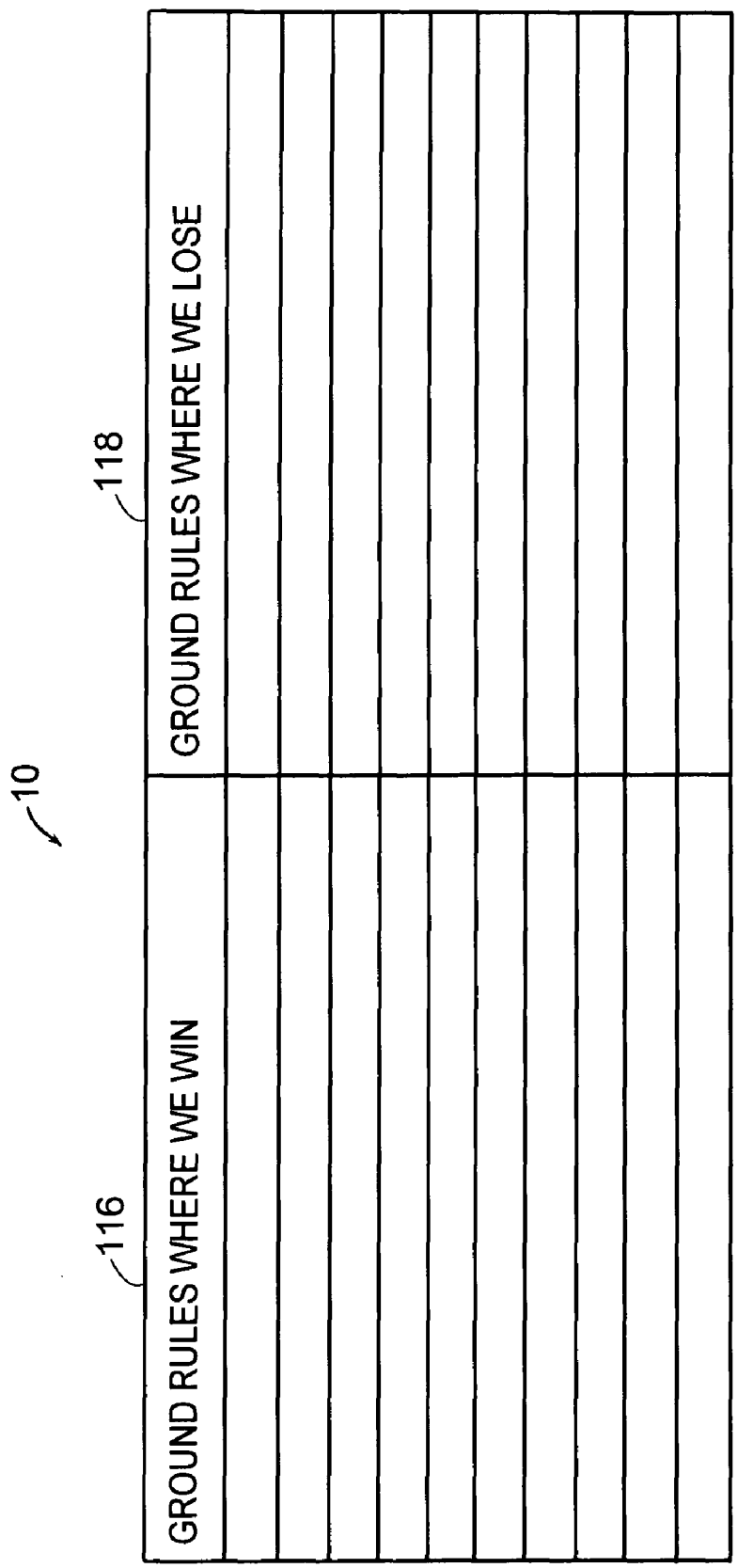
FIG. 10A illustrates an embodiment of a win/lose ground rules template.

As noted above, the win/lose ground rules template 10 (FIG. 1) is directed to identifying criteria relating to reasons why sales for a particular offering are won or lost, based on information from the competitive landscape template 9. An embodiment of the template is shown in FIG. 10A. The template includes a first column 116 for listing so-called ground rules indicating "where we win". Likewise, a second column 118 is provided for listing ground rules indicating "where we lose". FIG. 10B shows a template that includes sample information for the illustrative example.

The competitive tactics template 11 (FIG. 1) provides the sales channel with an indication of the tactics that competitors may use to position their offerings against the company's offerings, based on information from the competitive landscape template 9. An embodiment of the template is illustrated in FIG. 11A. The template includes a first column 120 for listing entries indicating information relating to what the competitors will stress. Columns 122 are included for each identified competitor. A marking (e.g., a checkmark or 'x') in a particular column 122 is used to indicate whether an entry in column 120 applies to one or more competitors. A template having sample information for the illustrative example is shown in FIG. 11B.

The probability questions template 12 is directed to helping the sales channel determine the probability of eventually closing the sale. As noted above, the capabilities of the company's offering in the competitive landscape template 9 (FIG. 9A) that are ranked higher than competitive offerings are used to develop ideal buying criteria queries or probability questions. An embodiment of the probability questions template is illustrated in FIG. 12A. The template includes four sections: ideal buying criteria questions 124, decision process questions 126, time frame questions 128 and budget questions 130. FIG. 12B shows a template with sample information based on the illustrative example.

Figure 13A:
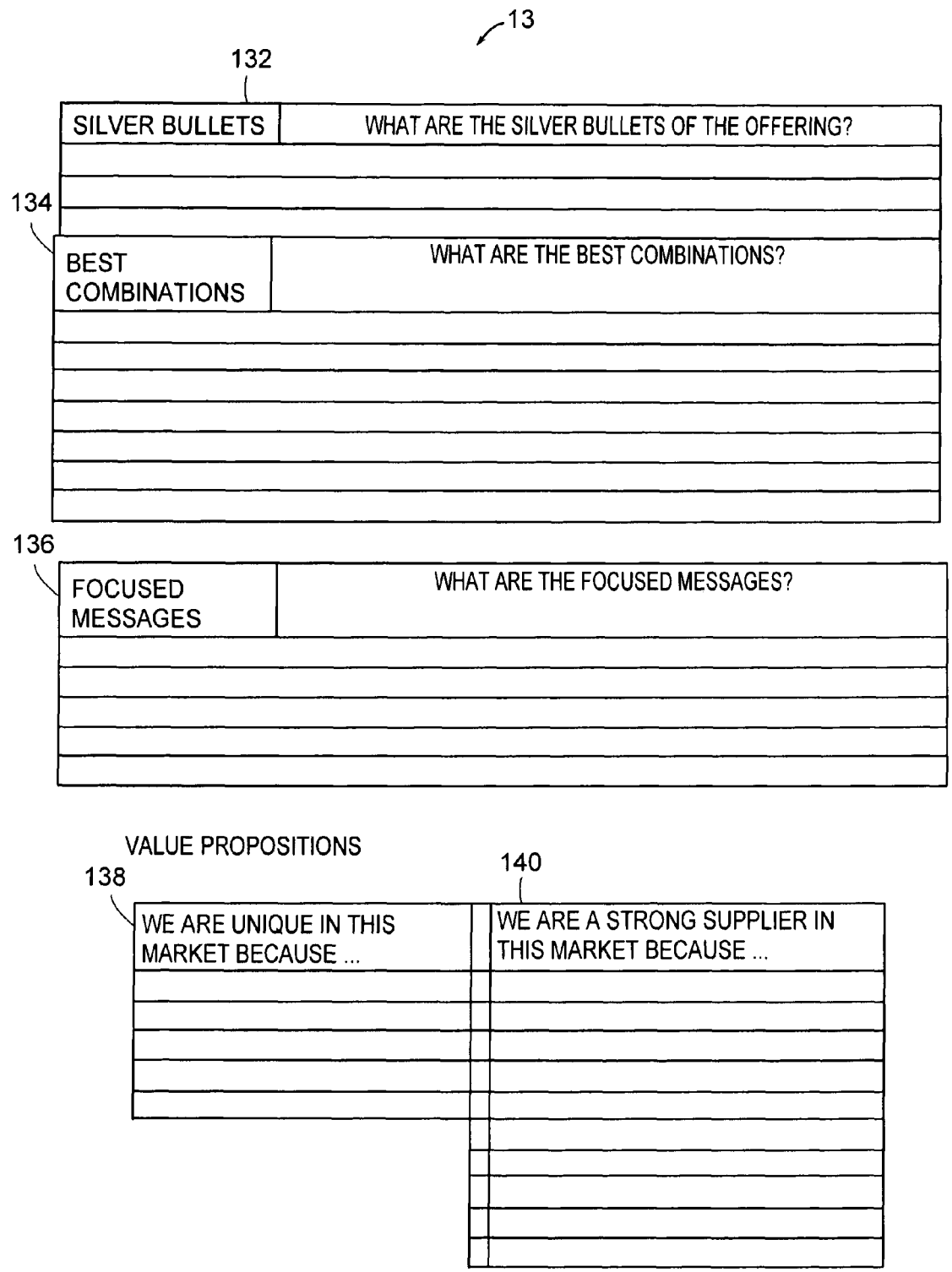
FIG. 13A illustrates an embodiment of a value proposition template.

The value proposition template 13 is directed to providing the sales channel with information corresponding to high impact, focused speaking points for use in communicating with prospects and customers. The capabilities of the company's offering that are ranked higher than competitive offerings in the competitive landscape template 9 (FIG. 9A) are also used to develop a value proposition, also referred to as messaging components. An embodiment of the value proposition template is illustrated in FIG. 13A. The template includes three sections that correspond to speaking points: silver bullets 132, best combinations 134 and focused messages 136. A value propositions section includes an area 138 for indicating information relating to reasons why the company is unique in the particular market of interest. Area 140 of the value propositions section is used to indicate information concerning reasons why the company is considered a strong supplier in that market. A template with sample information for the illustrative example is shown in FIGS. 13B and 13C.

Capabilities of the company's offering in the competitive landscape template 9 (FIG. 9A) that rank higher than competitive offerings are used to develop the opening sales script or so-called two-minute drill template 14 (FIG. 1). The two-minute drill template 14 provides the sales channel with information corresponding to an opening sales presentation that can be used to effectively earn qualities such as trust and confidence of the prospective customer of the offering of interest. An embodiment of a two-minute drill template 14 is shown in FIG. 14A. The template includes four sections 142, 144, 146, 148 for indicating information corresponding to answers to questions of "who I am", "who I represent", "how our company differentiates itself" and "how you might possibly benefit by selecting our company as your business partner", respectively. A template with sample information based on the illustrative example is shown in FIG. 14B.

The proposal template 15 (FIG. 1) is directed to providing the sales channel with an outline for presenting customer solutions. An embodiment of a proposal template may include the following elements:

---

Executive overview
Results of customer interviews
Key customer challenges
Company solution overview -
 mapped to key challenges
Implementation details
Project plan and timeline
Investment requirements
Return on investment
Appendices
Contract and payment terms
Spec sheets and supporting literature

---

Figure 15:
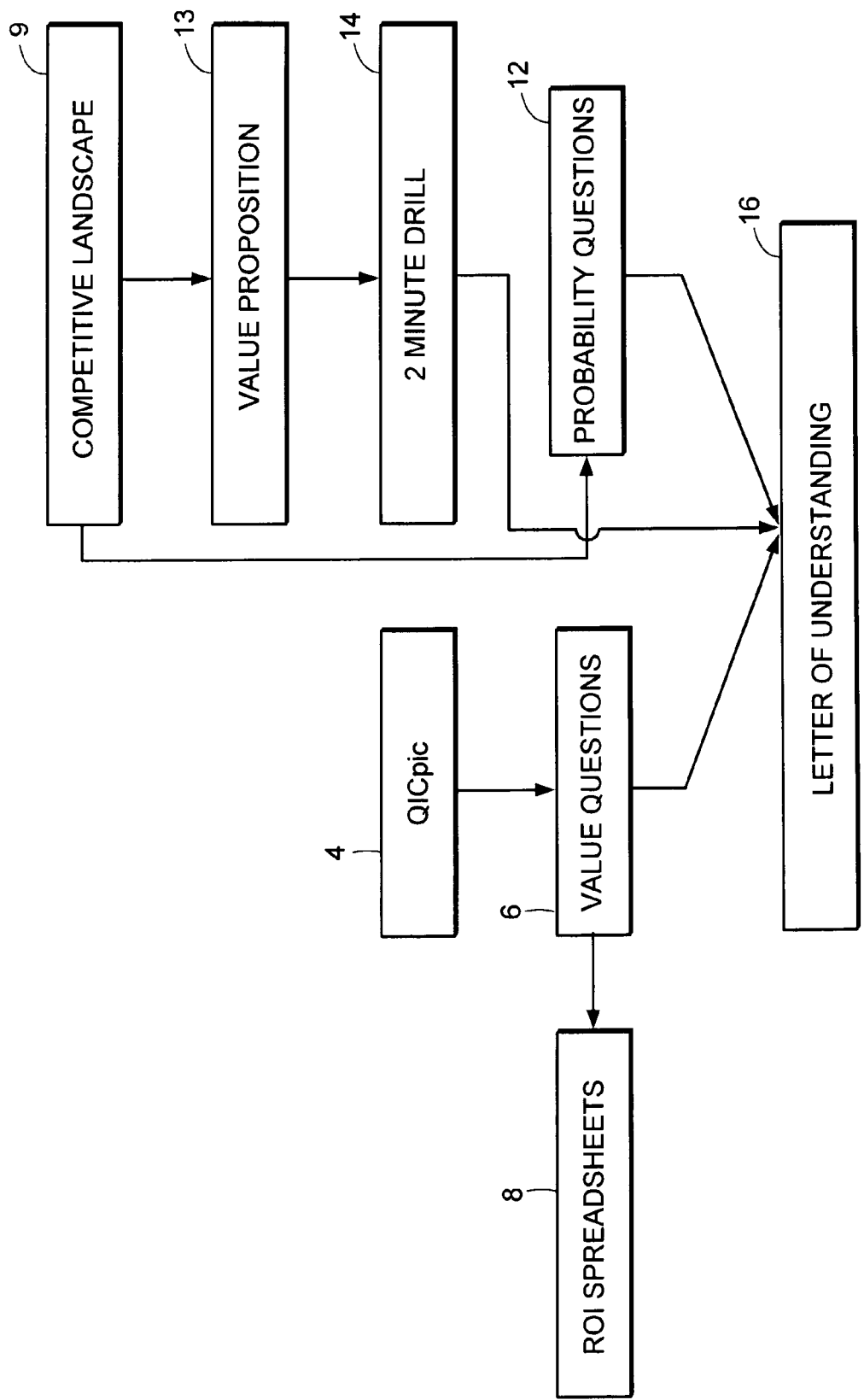
FIG. 15 illustrates a process for using quality selling information to document customer needs assessments.

Having described the template elements that can be used to develop a sales guide containing quality selling information, a process for using the sales guide to document customer needs assessments is now described. Reference is now made to FIG. 15 which illustrates an embodiment of a process for developing a documented customer needs assessment or so-called letter of understanding 16 based on information derived from the QICpic template 4 (FIG. 4A), value questions template 6 (FIG. 6A), ROI spreadsheet template 8 (FIG. 8A), competitive landscape template 9 (FIG. 9A), probability questions template 12 (FIG. 12A), value proposition template 13 (FIG. 13A) and two-minute drill template 14 (FIG. 14A).

Generally, information from the QICpic template 4, competitive landscape template 9, value questions template 6 and the probability questions template 12 is accessed by sales persons of the company to conduct a customer needs assessment. One or more qualifiers relating to an offering from the QICpic template are identified. Value criteria for each qualifier are determined using the value questions template to identify potential value of the sales offering. Ideal buying criteria are determined based on the competitive analysis information of the competitive landscape template. From the value and buying criteria, sales information can be developed. In particular, the resulting documentation of the assessment is generated as a letter of understanding (LOU) 16. The LOU can be used to develop customer-centered solutions, communicate customer information throughout the organization and with partners, develop return on investment projections, develop proposals, close and negotiate, and can be archived to retain important customer information. An embodiment of the LOU includes the following descriptive elements: present situation, desired result, impact, decision criteria, decision process, timeframe, budget and next steps. The following table lists information for these elements based on the illustrative example:

| | |
|---|---|
| Present situation | Rampac Manufacturing is a leading supplier of high performance parts for customizing high performance automobiles. Rampac parts are the components of choice for many NASCAR and drag racing crews throughout the United States. Parts are distributed to over 2500 key customers, and the company enjoys a tremendous amount of repeat business from its customer base. Revenues are currently at $955 million, and have been growing steadily since the company's inception in 1966. Profit margins have always been good, but recently have been shrinking. The cause for this is the increase administrative costs associated with having knowledgeable support people man a bank of phones to answer technical questions and provide sales support. In the last two years alone these costs have risen over 185%, costing the company approximately $7.5 million in profits. In February of 2000 you initiated an aggressive program to use the Internet to improve customer communications, lower labor costs, and more tightly link your key customers to your manufacturing floor. The desired outcome was lower cost and improved service. This has not happened. The system is bogged down, customers complain that they can't find what they want, and that the system is "too slow". Costs have increased and customer satisfaction has gone down as a result. |
| Desired result | You have decided that you will not give up on the Internet because you believe it is the best (and only) way to get administrative costs under control and improve customer satisfaction. You are actively looking for a company with the expertise to "straighten out somebody else's mess", by doing a complete analysis of what you have, what you should have, and link this to your business process so that you achieve your objectives. You indicated that, fortunately, the recent drop in customer satisfaction levels has not cost you a great deal of business. This is due to the high quality of your products, your reputation in the business, and the belief your customers have that this is "just a speed bump" - they have faith that you'll straighten it out. |
| Impact | If you do not straighten this out soon, customers will lose faith and you believe you will start to lose business. A Canadian competitor is looking to enter the US market, and any vulnerability on your part would be an open invitation for them to attack your customer base. They could easily cost you $10-15 million in revenue if they got a foothold in your market. If you can put in the type of Internet communication system you originally envisioned, not only will this make it very unattractive for competitors to attack your base, it would also enable you to continue growing the business at about $9 to $10 million (10% growth) for the next two years. You also indicated that such a system could increase profits by $7 million in year one, and $11.4 million in year two. |
| Decision criteria | The following items were mentioned as critical criteria for selecting a vendor: They must have experience in analysis, design, implementation, and linking technical systems to business processes. This needs to be verified with solid references. You've become convinced that an overall architectural plan is required to do this right, and would like to see a sample of such a plan done by vendors who make it to your "short list" Manufacturing expertise would be a big plus Manufacturing references (on top of expertise) would be an even bigger plus The vendor has to have a solid plan that outlines the progress they anticipate making in the next 12 months, given a $2 million budget. |
| Decision process | As the president of the company, you are the sole decision maker on purchases up to $2.5 million. Purchases larger than that will require a meeting of the Board of Directors, who usually approve anything you bring to them as long as payback can be achieved in less than 18 months. |
| Time frame | You are anxious to get moving as soon as possible. To achieve this, you want a Reference Report from each of the five vendors you are considering. These are due on March 21, and you will pick three "short list" vendors and contact them on Monday, March 24. Each vendor has to have a proposal to you by Friday, March 28, and meetings with each vendor will be held the following week. Your intent is to make a decision by Monday, March 31, and have the selected vendor start work on Friday, April 4. |
| Budget | You have allocated $2 million for this fiscal year. You know that fixing all your ills could cost more than double this figure, but you want to keep this year's expenditures within the confines of that amount. However, you have also indicated that if a vendor provides a solid reason why more should be spent this year because it will generate a better return on investment, you will go to the Board for approval of additional funds. |

| | |
|---|---|
| Next steps | Please review this letter for accuracy, and let me know if there's anything I misunderstood or left out. I'll contact you by this Friday to get your observations. If you prefer, you can send me a quick note or FAX with any concerns or changes. Once I'm sure we are on the same track, we will start working on the plans we would submit to achieve your objectives. Thanks again for your time. |

Figure 16:
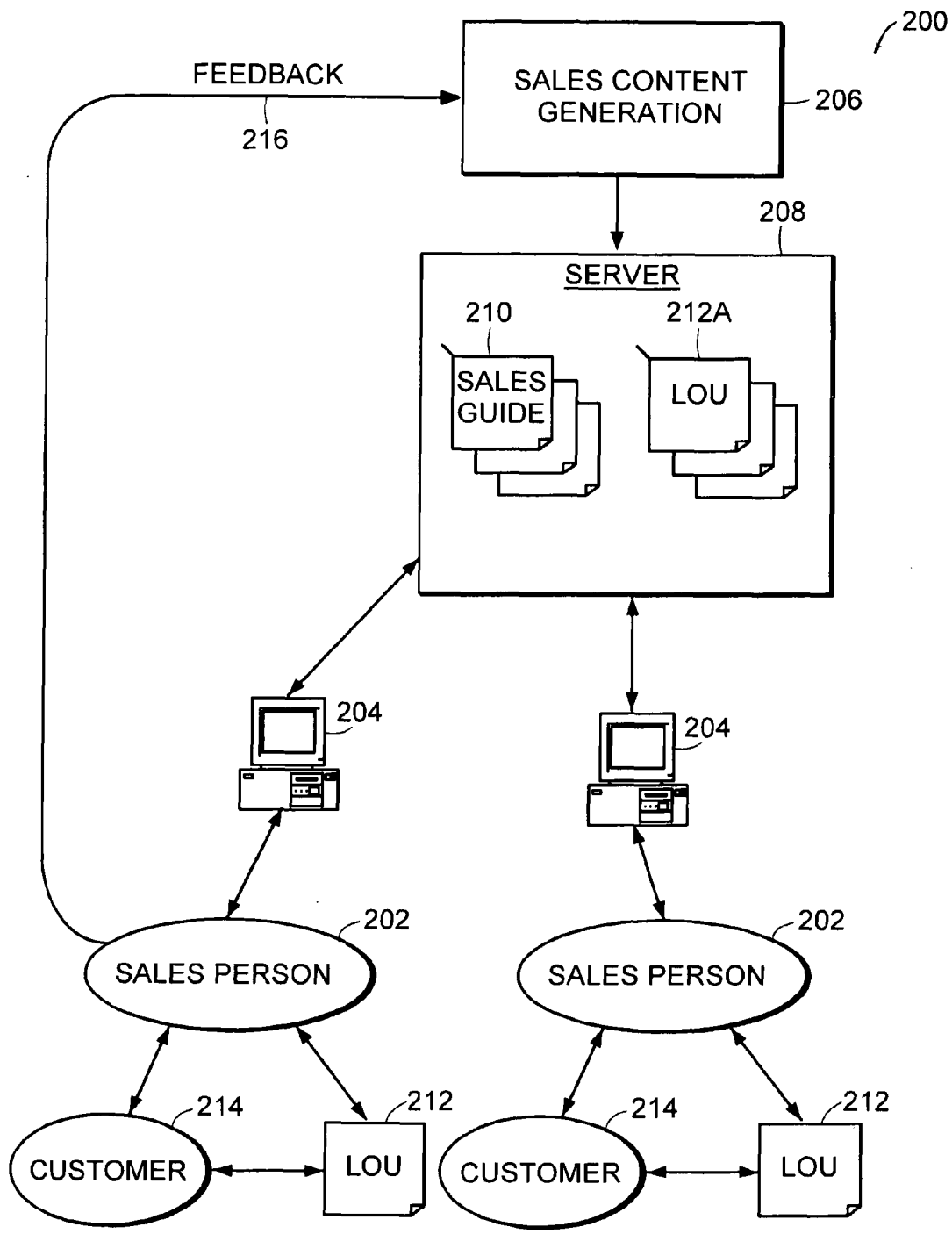
FIG. 16 is a block diagram of a quality selling information system.

Having described processes for developing the sales guides based on templates (FIG. 1) and using the sales guide templates to develop LOUs (FIG. 15), a quality selling information system 200 is now described with reference to FIG. 16. The system includes a server 208 that stores and archives developed sales guides 210 and LOUs 212A. The server 208 can be any computer-based device or system having storage and processing capabilities accessible over a local area or wide area network, and may comprise a customer relationship management system server that is accessible over the Internet or corporate intranets or both. The sales guides 210 may comprise information based on the process described in connection with FIG. 1, FIG. 15 or other process for developing quality selling information, as represented by sales content generation block 206. The LOUs 212A may comprise information relating to a customer needs assessment conducted with respect to a particular customer or customers of an offering corresponding to a particular sales guide 210.

In operation of the system, sales persons 202 have the ability to access the server 208 via computer 204 to retrieve a particular sales guide pertaining to an offering of interest to a customer 214. Based on interactions with the customer 214 using information contained in templates of the retrieved sales guide 210, the sales person may develop a new LOU 212 for that customer. In other situations, the sales person may retrieve an archived LOU 212A to be modified for use with the customer. The newly developed LOU 212 or modified LOU can be subsequently stored on the server 208.

According to one aspect of the system 200, the Internet or a corporate intranet may be used to post to the server 208 the quality selling information embodied in the sales guides 210 developed by the marketing organization. This can help both the sales organization and business partners to quickly find the quality "who to sell" and "how to sell" information for an unlimited number of offerings. In addition, such posting capability facilitates the introduction of additional offerings and allows new sales personnel to rapidly acquire the quality selling information needed to perform at a high skill level. Likewise, posting documented LOUs to a customer relationship management system provides sales and customer support personnel with useful and important historical customer information. Product development and marketing personnel can use the documented LOUs to identify new market or product opportunities. In addition, such documentation can be used to provide quality control with respect to the sales organization and partners that conduct the customer needs assessments.

Another aspect of the system 200 is feedback between the sales channel and the marketing organization. This is represented in FIG. 16 as a feedback loop 216 from the sales person 202 and the sales content generation block 206. Such a loop between marketing and the sales channel allows the company to adjust and revise the marketing plans embodied in the sales guides 210 at selected intervals, e.g., periodically or based on milestones in the selling cycle. When improvements to the quality selling information are identified by the sales channel, the Internet can be used to communicate these improvements back to marketing who in turn updates the quality selling information. This ensures that a company's tactical selling information will change in real time as changes occur in the market place. This can be accomplished through the continuous input and best practices of all participants in the marketing plan implementation chain.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system of developing a customer needs assessment, the system comprising:
    a qualifier template identifying at least one qualifier pertaining to a sales offering;
    a value template coupled to the qualifier template, the value template including at least one of the qualifiers from the qualifier template;
    a competitive analysis template providing ideal buying criteria in connection with the sales offering;
    customer needs assessment data including output from the value template and the competitive analysis template; and
    a server configured to store and retrieve the qualifier, value and competitive analysis templates and the customer needs assessment data, where the qualifier, value and competitive analysis templates are configured to be updated based on an iterative process that is responsive to feedback about the customer needs assessment data.

2. A system of developing a customer needs assessment according to claim 1 wherein each qualifier further includes a characteristic which relates to a buyer or a seller.

3. A system of developing a customer needs assessment according to claim 2 wherein the characteristic is at least one of: an attribute of the seller, attribute of the buyer, potential need of the buyer, or potential problem for the buyer.

4. A computer program product according to claim 3 wherein a server includes the one or more processors, the server being configured to store and retrieve the qualifier, value and competitive analysis templates and the customer needs assessment data.

5. A system of developing a customer needs assessment according to claim 1 wherein the value template is configured to determine value criteria for at least one of the qualifiers using an open-ended query statement.

6. A system of developing a customer needs assessment according to claim 5 wherein the open-ended query statement enables a seller to determine a potential problem for a buyer.

7. A computer program product according to claim 5 wherein the templates are updatable on the server based on an iterative process that is responsive to feedback about the customer needs assessment data.

8. A system of developing a customer needs assessment according to claim 6 wherein the open-ended query statement is used by the seller in an information gathering procedure that is arranged to enable the seller to determine information relevant to solving the potential problem for the buyer.

9. A system of developing a customer needs assessment according to claim 1 wherein the competitive analysis template is configured to determine ideal buying criteria based on a competitive analysis by determining a potential value of the sales offering by using the value criteria to process a quantitative analysis.

10. A system of developing a customer needs assessment according to claim 9 wherein the competitive analysis is based on a strengths and weaknesses analysis of the sales offering.

11. A system of developing a customer needs assessment, the system comprising:
- one or more computer processors configured to process a qualifier template, a value template, a competitive analysis template, and customer needs assessment data;
- the qualifier template configured to identify at least one qualifier pertaining to a sales offering;
- the value template being coupled to the qualifier template, the value template configured to include at least one of the qualifiers from the qualifier template;
- the competitive analysis template configured to provide ideal buying criteria in connection with the sales offering; and
- the customer needs assessment data including output from the value template and the competitive analysis template.

12. A system according to claim 11 further comprising a server for storage and retrieval of the qualifier, value and competitive analysis templates and the customer needs assessment data.

13. A system according to claim 12 wherein the templates can be updated on the server based on an iterative process that is responsive to feedback about the customer needs assessment data.

14. A computer program product for developing a customer needs assessment, the program product comprising code embodied on a non-transitory computer-readable medium and configured so as when executed on a processor to process:
- a qualifier template configured to identify at least one qualifier pertaining to a sales offering;
- a value template being coupled to the qualifier template, the value template configured to include at least one of the qualifiers from the qualifier template;
- a competitive analysis template configured to provide ideal buying criteria in connection with the sales offering; and
- customer needs assessment data including output from the value template and the competitive analysis template.

* * * * *

UNITED STATES PATENT AND TRADEMARK OFFICE
CERTIFICATE OF CORRECTION

PATENT NO. : 8,335,707 B2
APPLICATION NO. : 12/321367
DATED : December 18, 2012
INVENTOR(S) : Robert J. Petrossi Page 1 of 1

It is certified that error appears in the above-identified patent and that said Letters Patent is hereby corrected as shown below:

On the front of the above-referenced U.S. Patent, under section (62) and in Column 1, Line 7 delete "7,449,870", and insert --7,499,870--.

Signed and Sealed this
Twenty-sixth Day of February, 2013

Teresa Stanek Rea
*Acting Director of the United States Patent and Trademark Office*